US012583126B2

(12) United States Patent
Ragusila et al.

(10) Patent No.: US 12,583,126 B2
(45) Date of Patent: \*Mar. 24, 2026

(54) HUMANOID ROBOT WITH A CENTRAL REGION HAVING AN ARRANGEMENT OF ACTUATOR ASSEMBLIES AND COMPONENTS

(71) Applicant: Figure AI Inc., San Jose, CA (US)

(72) Inventors: Victor Ragusila, San Jose, CA (US); Brian Mick, San Jose, CA (US); Stephen Morfey, San Jose, CA (US); Shubham Jayprakash Chotia, San Jose, CA (US)

(73) Assignee: FIGURE AI INC., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/332,867

(22) Filed: Sep. 18, 2025

(65) Prior Publication Data

US 2026/0014709 A1    Jan. 15, 2026

Related U.S. Application Data

(63) Continuation of application No. 19/252,708, filed on Jun. 27, 2025, now Pat. No. 12,447,628, and a
(Continued)

(51) Int. Cl.
B25J 19/00 (2006.01)
B25J 9/00 (2006.01)
B25J 11/00 (2006.01)

(52) U.S. Cl.
CPC ......... B25J 11/0015 (2013.01); B25J 9/0009 (2013.01); B25J 19/00 (2013.01)

(58) Field of Classification Search
CPC ...... B25J 9/1697; B25J 9/0084; B25J 9/1653; B25J 9/00; B25J 9/0009; B25J 11/0015;
(Continued)

(56) References Cited

U.S. PATENT DOCUMENTS 4,804,220 A    2/1989 Rosheim
4,834,761 A    5/1989 Walters
(Continued)

FOREIGN PATENT DOCUMENTS

CN    303298408    7/2015
CN    209615545    11/2019
(Continued)

OTHER PUBLICATIONS

Or, Humanoids Grow a Spine: The Effect of Lateral Spinal Motion on the Mechanical Energy Efficiency, 2012, IEEE, p. 1-11 (Year : 2012).*
(Continued)

*Primary Examiner* — Mcdieunel Marc

(57) ABSTRACT

A humanoid robot includes an upper region, a lower region, and a central region. The upper region includes a head, a torso, and a pair of arms coupled to the torso. The lower region is spaced apart from the upper region and includes a pair of legs. The central region is located between the upper region and the lower region and is configured to allow movement of the upper region and the lower region relative to one another. The central region of the humanoid robot is also configured to provide and facilitate at least three types of discrete movement—pitch, roll, and yaw—both forward and backward, both left and right, and independently or at the same time, of the upper region relative to the lower region to provide the humanoid robot with functionality that substantially mirrors movements that most human beings are typically capable of during daily life.

29 Claims, 24 Drawing Sheets

Related U.S. Application Data continuation of application No. 19/252,392, filed on Jun. 27, 2025, now Pat. No. 12,466,080, which is a continuation of application No. 18/919,263, filed on Oct. 17, 2024, now Pat. No. 12,365,094, which is a continuation-in-part of application No. 18/914,800, filed on Oct. 14, 2024, which is a continuation-in-part of application No. 18/904,332, filed on Oct. 2, 2024, said application No. 18/919,263 is a continuation-in-part of application No. 29/935,680, filed on Apr. 3, 2024, which is a continuation-in-part of application No. 29/928,748, filed on Feb. 15, 2024, which is a continuation-in-part of application No. 29/889,764, filed on Apr. 17, 2023.

(60) Provisional application No. 63/707,897, filed on Oct. 16, 2024, provisional application No. 63/708,003, filed on Oct. 16, 2024, provisional application No. 63/707,949, filed on Oct. 16, 2024, provisional application No. 63/707,547, filed on Oct. 15, 2024, provisional application No. 63/626,037, filed on May 28, 2024, provisional application No. 63/634,697, filed on Apr. 16, 2024, provisional application No. 63/573,528, filed on Apr. 3, 2024, provisional application No. 63/573,226, filed on Apr. 2, 2024, provisional application No. 63/566,595, filed on Mar. 18, 2024, provisional application No. 63/564,741, filed on Mar. 13, 2024, provisional application No. 63/626,034, filed on Mar. 13, 2024, provisional application No. 63/561,316, filed on Mar. 5, 2024, provisional application No. 63/626,035, filed on Feb. 27, 2024, provisional application No. 63/626,028, filed on Feb. 27, 2024, provisional application No. 63/626,030, filed on Feb. 21, 2024.

(58) Field of Classification Search
CPC ......... G06F 3/013; G06F 3/017; B65G 43/08; B65G 2203/041
See application file for complete search history.

(56) References Cited

U.S. PATENT DOCUMENTS

| | | | |
|---|---|---|---|
| 4,986,723 A | 1/1991 | Maeda | |
| 5,394,766 A | 3/1995 | Johnson | |
| 5,447,403 A | 9/1995 | Engler, Jr. | |
| 6,477,058 B1 | 11/2002 | Luebs | |
| 6,732,015 B2 * | 5/2004 | Maeda | B25J 19/0091 |
| | | | 446/457 |
| 6,901,313 B2 | 5/2005 | Mori | |
| 6,980,889 B2 * | 12/2005 | Ito | G06N 3/09 |
| | | | 901/1 |
| 7,024,276 B2 * | 4/2006 | Ito | G06N 3/008 |
| | | | 318/568.15 |
| 7,031,806 B2 | 4/2006 | Kuroki | |
| 7,072,741 B2 * | 7/2006 | Nagashima | G06N 3/008 |
| | | | 901/33 |
| 7,099,747 B2 * | 8/2006 | Mikami | G05D 1/0891 |
| | | | 180/8.1 |
| 7,113,849 B2 | 9/2006 | Kuroki | |
| 7,308,336 B2 * | 12/2007 | Takenaka | B62D 57/02 |
| | | | 901/1 |
| 7,319,917 B2 * | 1/2008 | Takenaka | B62D 57/032 |
| | | | 901/1 |
| 7,319,918 B2 * | 1/2008 | Takenaka | B62D 57/032 |
| | | | 901/1 |
| 7,337,039 B2 * | 2/2008 | Takenaka | B62D 57/02 |
| | | | 901/1 |
| 7,379,789 B2 * | 5/2008 | Takenaka | B62D 57/032 |
| | | | 901/1 |
| 7,386,364 B2 * | 6/2008 | Mikami | B62D 57/02 |
| | | | 318/568.22 |
| 7,496,428 B2 * | 2/2009 | Takenaka | B62D 57/032 |
| | | | 901/1 |
| 8,511,964 B2 | 8/2013 | Linn | |
| 8,942,849 B2 | 1/2015 | Maisonnier | |
| 10,988,192 B1 | 4/2021 | Thorne | |
| D918,979 S | 5/2021 | Mullan | |
| D921,081 S | 6/2021 | Laplante | |
| 11,247,738 B2 | 2/2022 | Lavalley | |
| 11,292,126 B2 | 4/2022 | Christensen | |
| 11,632,991 B2 | 4/2023 | Hull | |
| 11,699,884 B2 | 7/2023 | Braun | |
| 11,924,023 B1 | 3/2024 | Smith | |
| 12,246,441 B1 | 3/2025 | Abate | |
| 12,365,094 B2 | 7/2025 | Mccall | |
| 12,403,611 B2 | 9/2025 | Mccall | |
| 12,472,648 B1 | 11/2025 | Hadas | |
| 2004/0075168 A1 | 4/2004 | Azuma | |
| 2005/0072558 A1 | 4/2005 | Whitney | |
| 2007/0035143 A1 | 2/2007 | Blackwell | |
| 2008/0239678 A1 | 10/2008 | Ploeg | |
| 2008/0240889 A1 | 10/2008 | Yokoyama | |
| 2011/0040408 A1 | 2/2011 | De La Rosa Tames | |
| 2011/0067520 A1 | 3/2011 | Ihrke | |
| 2011/0068595 A1 | 3/2011 | Ihrke | |
| 2011/0071673 A1 | 3/2011 | Ihrke | |
| 2011/0071678 A1 | 3/2011 | Ihrke | |
| 2012/0155775 A1 | 6/2012 | Ahn | |
| 2013/0175816 A1 | 7/2013 | Kawasaki | |
| 2014/0039675 A1 | 2/2014 | Ead | |
| 2014/0217762 A1 | 8/2014 | Ihrke | |
| 2016/0064263 A1 | 3/2016 | Hosek | |
| 2017/0032035 A1 | 2/2017 | Gao | |
| 2018/0104823 A1 | 4/2018 | Kaku | |
| 2018/0293517 A1 | 10/2018 | Browne | |
| 2018/0357552 A1 | 12/2018 | Campos | |
| 2020/0180145 A1 | 6/2020 | Xiong | |
| 2020/0180146 A1 | 6/2020 | Xiong | |
| 2020/0180167 A1 | 6/2020 | Xiong | |
| 2020/0182336 A1 | 6/2020 | Xiong | |
| 2020/0182337 A1 | 6/2020 | Xiong | |
| 2021/0162602 A1 | 6/2021 | Kawaguchi | |
| 2022/0227010 A1 | 7/2022 | Takabu | |
| 2022/0287853 A1 | 9/2022 | Ren | |
| 2022/0410378 A1 | 12/2022 | Deits | |
| 2023/0033779 A1 | 2/2023 | Gazeau | |
| 2023/0048725 A1 | 2/2023 | Barbour | |
| 2023/0112596 A1 | 4/2023 | Yang | |
| 2023/0154055 A1 | 5/2023 | Besenbruch | |
| 2024/0044331 A1 | 2/2024 | Sterling | |
| 2024/0289606 A1 | 8/2024 | Wang | |
| 2024/0294219 A1 | 9/2024 | Gildert | |
| 2024/0299195 A1 | 9/2024 | Perry | |
| 2024/0430464 A1 | 12/2024 | Kalva | |
| 2025/0042024 A1 | 2/2025 | Dijkman | |
| 2025/0187202 A1 | 6/2025 | Mccall | |
| 2025/0205908 A1 | 6/2025 | Goldsmith | |

FOREIGN PATENT DOCUMENTS

| | | |
|---|---|---|
| CN | 114147745 | 3/2022 |
| DE | 112018003604 | 11/2023 |
| WO | 2020190594 | 9/2020 |
| WO | 2022207106 | 10/2022 |
| WO | 2023107501 | 6/2023 |
| WO | 2023110778 | 6/2023 |
| WO | 2023246994 | 12/2023 |
| WO | 2024072966 | 4/2024 |

OTHER PUBLICATIONS

Souissi et al., Influence of the number of humanoid vertebral column pitch joints in flexion movements, 2011, IEEE, p. 227-282 ( Year: 2011).*

Or, Computer Simulations of a Humanoid Robot Capable of Walking Like Fashion Models, 2012, IEEE, p. 241-248 (Year: 2012).*

(56)　　References Cited

OTHER PUBLICATIONS

Hao et al., Design and kinematics analysis of a 4-DOF articulated steering mechanism, 2015, IEEE, p. 5875-5880 (Year: 2015).*

U.S. Appl. No. 18/904,332, filed Oct. 2, 2021, Victor et al.*

International Search Report for PCT/US2025/016930.

Netzev et al., Design and implementation of a spherical joint for mobile manipulators, 2019, IEEE, p. 342-348 (Year: 2019).

Haddadin et al., The "DLR crash report": Towards a standard crash-testing protocol for robot safety—Part II: Discussions, 2009, IEEE, p. 280-287 (Year: 2009).

Yaghoubi et al., Region-Based CNNs for Pedestrian Gender Recognition in Visual Surveillance Environments, 2019, IEEE, p. 1-5 (Year: 2019).

Pateromichelakis et al., Head-eyes system and gaze analysis of the humanoid robot Romeo, 2014, IEEE, p. 1374-131379 (Year: 2014).

Mokhtari et al., Taban:A Retro-Projected Social Robotic—Head for Human-Robot Interaction, 2019, IEEE, p. 46-51 (Year: 2019).

International Search Report for PCT/US25/23325.

Merged original document with English translation (CN 112959343); Paragraphs added for citation purposes. (Year: 2025).

Merged original document (KR 20180107353) with English Translation (Year: 2025).

Duran-Hernandez et al., "Control Implementation in a Low-cost Designed Biped Robot to Reproduce Squats," The 10th International Conference on Control, Mechatronics and Automation, Nov. 9, 2022.

Available online at https://www.youtube.com/watch?v=Fb_R6IDDU4A, at least as early as Oct. 9, 2020.

Available online at https://www.youtube.com/watch?v=_mQJw8VhZ7w, at least as early as Oct. 5, 2022.

Available online at https://www.youtube.com/watch?v=a-R4H8-8074, at least as early as Jun. 6, 2015.

Available online at https://www.youtube.com/watch?v=1fC7b2LjVW4, at least as early as Jul. 12, 2016.

Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).

Shafti et al., Real-time Robot-assisted Ergonomics, 2019, IEEE, p. 1975-1981 (Year: 2019).

Luo et al., Human body trajectory generation using point cloud data for robotics massage applications, 2014, IEEE, p. 5612-5617 (Year: 2014).

Cheng et al., Human posture estimation using voxel data for "smart" airbag systems: issues and framework, 2004, IEEE, p. 84-89 (Year: 2004).

Available online at https://x.com/Tesla/status/1986558797947580555, at least as early as Nov. 6, 2005.

Available online at https://x.com/Tesla_Optimus/status/1964425666834931730, at least as early as Sep. 6, 2025.

Available online at https://x.com/Tesla_Optimus/status/1925047336256078302, at least as early as May 21, 2025.

Available online at https://x.com/elonmusk/status/1922083384085430492, at least as early as May 12, 2025.

Available online at https://x.com/Tesla_Optimus/status/1914781858706985363, at least as early as Apr. 22, 2025.

Available online at https://x.com/Tesla_Optimus/status/1866171391156113740, at least as early as Dec. 9, 2024.

Available online at https://x.com/Tesla_Optimus/status/1862116407594377698, at least as early as Nov. 28, 2024.

Available online at https://x.com/Tesla_Optimus/status/1844789517833629717, at least as early as Oct. 11, 2024.

Available online at https://x.com/elonmusk/status/1752516361799258318, at least as early as Jan. 30, 2024.

Available online at https://www.youtube.com/watch?v=6JwClvNwoYw, at least as early as Oct. 6, 2025.

Available online at https://www.youtube.com/watch?v=Sdz21k-X7gc, at least as early as Oct. 4, 2025.

Available online at https://www.youtube.com/watch?v=xDf94C2AoYQ, at least as early as Nov. 9, 2025.

Available online at https://www.youtube.com/shorts/mOlxtSSa1NE, at least as early as Sep. 3, 2025.

Available online at https://www.youtube.com/watch?v=mveqrNJj8ME, at least as early as Oct. 31, 2025.

Available online at https://youtu.be/LTYMWadOW7c?si=QbgG44DJi7LVNAvf, at least as early as Oct. 28, 2025.

Available online at https://youtu.be/dD3YBKOUKHk?si=PibnkCacKZfPGD4Y, at least as early as Jul. 9, 2025.

Available online at https://youtu.be/JUz-hyP5PMg?si=s5clcTTKitRXS_OZ, at least as early as Jun. 11, 2025.

Available online at https://www.youtube.com/watch?v=Dp6sqx9BGZs, at least as early as Jun. 11, 2025.

Available online at https://www.youtube.com/watch?v=i1SvmFWu834, at least as early as Mar. 21, 2025.

Available online at https://www.youtube.com/watch?v=r2r26ebhtYQ, at least as early as Feb. 25, 2025.

Available online at https://www.youtube.com/watch?v=uVcBa6NXAbk, at least as early as Feb. 21, 2025.

Available online at https://www.youtube.com/watch?v=I44_zbEwz_w, at least as early as Mar. 19, 2025.

Available online at https://www.youtube.com/watch?v=oe1dke3Cf7I, at least as early as May 28, 2025.

Available online at https://www.youtube.com/watch?v=gS4rOqNDTBk, at least as early as Oct. 8, 2025.

Available online at https://www.youtube.com/watch?v=HYwekersccY, at least as early as Aug. 20, 2025.

Available online at https://www.youtube.com/watch?v=dFObux6mfTc, at least as early as Apr. 28, 2025.

Available online at https://www.youtube.com/watch?v=F_7IPm7f1vl, at least as early as Oct. 30, 2024.

Available online at https://www.youtube.com/watch?v=v8UaiRgqvlc, at least as early as Mar. 5, 2025.

Available online at https://www.youtube.com/watch?v=X2JTgraC6Zk, at least as early as Nov. 18, 2025.

Available online at https://www.youtube.com/watch?v=PJgIY8xDGIc, at least as early as Nov. 12, 2025.

Available online at https://www.youtube.com/watch?v=QOi3dKzRoEo, at least as early as Nov. 10, 2025.

Available online at https://www.youtube.com/watch?v=6M6B2W8eqUU, at least as early as Nov. 10, 2025.

Available online at https://www.youtube.com/watch?v=m_Ag_SgsHVg, at least as early as Nov. 7, 2025.

Available online at https://www.youtube.com/watch?v=Yawmu4EQ53w, at least as early as Nov. 6, 2025.

Available online at https://www.youtube.com/watch?v=OhcqCt9ezaw, at least as early as Nov. 6, 2025.

Available online at https://www.youtube.com/watch?v=LdxlegrxsBQ, at least as early as Dec. 6, 2024.

Available online at https://www.youtube.com/shorts/Jdh9cnBDQe0, at least as early as Nov. 6, 2025.

Available online at https://www.youtube.com/watch?v=jjOfpsMRhL4, at least as early as Nov. 19, 2025.

Available online at https://www.youtube.com/watch?v=qDM5N_1QL9k, at least as early as Nov. 19, 2025.

Available online at https://www.youtube.com/watch?v=ERH-tMUHV1E, at least as early as Nov. 19, 2025.

Available online at https://www.youtube.com/watch?v=eUdBIFkMh-M, at least as early as Oct. 20, 2025.

Available online at https://www.youtube.com/watch?v=v1Q4Su54iho, at least as early as Jul. 25, 2025.

Available online at https://www.youtube.com/watch?v=0rwYOa7pJCs, at least as early as Apr. 1, 2025.

Available online at https://www.youtube.com/watch?v=mHP1WGIw5Wk, at least as early as Jul. 17, 2025.

Available online at https://www.youtube.com/watch?v=TNryO2uasws, at least as early as Jul. 23, 2025.

Available online at https://www.youtube.com/watch?v=pegIMP6t9xU, at least as early as Nov. 24, 2025.

Available online at https://www.youtube.com/watch?v=02v3_7n9gH8, at least as early as Nov. 24, 2025.

Available online at https://www.youtube.com/watch?v=LXVV-oErD8s, at least as early as Sep. 17, 2025.

(56) References Cited

OTHER PUBLICATIONS

Available online at https://www.youtube.com/watch?v=GcTUIOHvdOs, at least as early as Oct. 16, 2025.

Available online at https://www.youtube.com/watch?v=rnD1PeEJJIc, at least as early as Nov. 26, 2025.

Available online at https://www.youtube.com/watch?v=FGcQqyCaG5s, at least as early as Dec. 2, 2025.

Han et al., Mechanical design of robot lower body based on four-bar linkage structure for energy efficient bipedal walking, 2016, IEEE, p. 402-407 (Year: 2016).

Park et al., Design of a lower limb exoskeleton including roll actuation to assist walking and standing up, 2015, IEEE, p. 359-354 ( Year: 2015).

Tsagarakis et al., Lower body realization of the baby humanoid 'iCub', 2007, IEEE, p. 3616-3622 (Year: 2007).

* cited by examiner

HUMANOID ROBOT WITH A CENTRAL REGION HAVING AN ARRANGEMENT OF ACTUATOR ASSEMBLIES AND COMPONENTS

PRIORITY CLAIM AND CROSS-REFERENCE TO RELATED APPLICATIONS

This application is a continuation of U.S. patent application Ser. No. 19/252,708, filed on Jun. 27, 2025, which is a continuation of U.S. patent application Ser. No. 19/252,392, filed on Jun. 27, 2025, which is a continuation of U.S. patent application Ser. No. 18/919,263, filed Oct. 17, 2024, which is: (i) a continuation in part of U.S. patent application Ser. No. 18/914,800, filed Oct. 14, 2024, which is a continuation in part of U.S. patent application Ser. No. 18/904,332, filed Oct. 2, 2024, (ii) a continuation in part of U.S. Design patent application Ser. No. 29/935,680, filed Apr. 3, 2024, which is a continuation in part of U.S. Design Pat. application No. 29/928,748, filed Feb. 15, 2024, which is a continuation in part of U.S. Design patent application Ser. No. 29/889,764, filed Apr. 17, 2023, and (iii) claims priority under 35 U.S.C. § 119(e) to U.S. Provisional Patent Application No. 63/626,035, filed Feb. 27, 2024, U.S. Provisional Patent Application No. 63/564,741, filed Mar. 13, 2024, U.S. Provisional Patent Application No. 63/626,034, filed Mar. 13, 2024, and U.S. Provisional Patent Application No. 63/626,037, filed May 28, 2024, U.S. Provisional Patent Application No. 63/626,030, filed Feb. 21, 2024, U.S. Provisional Patent Application No. 63/566,595, filed Mar. 18, 2024, U.S. Provisional Patent Application No. 63/626,028, filed Feb. 27, 2024, U.S. Provisional Patent Application No. 63/573,528, filed Apr. 3, 2024, U.S. Provisional Patent Application No. 63/561,316, filed Mar. 5, 2024, U.S. Provisional Patent Application No. 63/634,697, filed Apr. 16, 2024, U.S. Provisional Patent Application No. 63/573,226, filed Apr. 2, 2024, U.S. Provisional Patent Application No. 63/707,949, filed Oct. 16, 2024, U.S. Provisional Patent Application No. 63/707,897, filed Oct. 16, 2024, U.S. Provisional Patent Application No. 63/707,547, filed Oct. 16, 2024, U.S. Provisional Patent Application No. 63/708,003, filed Oct. 16, 2024, each of which is expressly incorporated by reference herein in its entirety.

Reference is hereby made to U.S. Provisional Patent Application No. 63/557,874, filed Feb. 26, 2024, U.S. Provisional Patent Application No. 63/626,040, filed Jan. 28, 2024, U.S. Provisional Patent Application No. 63/626,105, filed Jan. 29, 2024, U.S. Provisional Patent Application No. 63/625,362, filed Jan. 26, 2024, U.S. Provisional Patent Application No. 63/625,370, filed Jan. 26, 2024, U.S. Provisional Patent Application No. 63/625,381, filed Jan. 26, 2024, U.S. Provisional Patent Application No. 63/625,384, filed Jan. 26, 2024, U.S. Provisional Patent Application No. 63/625,389, filed Jan. 26, 2024, U.S. Provisional Patent Application No. 63/625,405, filed Jan. 26, 2024, U.S. Provisional Patent Application No. 63/625,423, filed Jan. 26, 2024, U.S. Provisional Patent Application No. 63/625,431, filed Jan. 26, 2024, U.S. Provisional Patent Application No. 63/685,856, filed Aug. 22, 2024, U.S. Provisional Patent Application No. 63/696,507, filed Sep. 19, 2024, U.S. Provisional Patent Application No. 63/696,533, filed Sep. 19, 2024, and U.S. Provisional Patent Application No. 63/706,768, filed Oct. 14, 2024, each of which is expressly incorporated by reference herein in its entirety.

TECHNICAL FIELD

The present disclosure relates generally to robotics, and more specifically to a humanoid robot with an upper region including a head, a torso, and a pair of shoulders and arms; a lower region including a pair of legs and feet; and, a central region connecting the upper portion and the lower portion to one another and including a unique arrangement of actuators that provide for increased functionality and movement of the upper and lower regions relative to one another.

BACKGROUND

The current workplace landscape is marked by an unparalleled labor shortage, evident in over 10 million unsafe or undesirable jobs within the United States. To counter this ever expanding labor shortage, it has become imperative to design and integrate advanced robots capable of handling repetitive, unappealing and even hazardous workplace tasks. With the goal of performing these tasks in an optimal and efficient manner, advanced robots are typically general-purpose humanoid robots tailored for human-centric environments. These general-purpose humanoid robots emulate human form and functionality with two legs, two arms, and a face-like screen. However, with the general-purpose humanoid robot's emulation of the human body, the need arises for various actuators arranged within the robot to closely replicate human movements, functionality and capabilities. The need for actuators to be capable of mimicking human movement and functions extends far beyond cosmetic resemblance. For example, it is also desirable that the robot's various actuators be capable of manipulating the arms, legs, and other assemblies of the robot to seamlessly interact with and physically manipulate diverse objects in complex environments, while consistently performing in a reliable, cost-effective, and controllable manner using the robot's limited resources, including its battery power resources. Some humanoid robots are designed with numerous components to generally mimic human movements, but they also lack sufficient mobility and range of motion. Accordingly, there is a need for a humanoid robot with improved movement systems that provide increased and more efficient ranges of motion of various parts of the humanoid robot relative to one another.

BRIEF DESCRIPTION OF THE DRAWINGS

The drawing figures depict one or more implementations in accord with the present teachings, by way of example only, and not by way of limitation. In the figures, like reference numerals refer to the same or similar elements shown across various other figures.

DETAILED DESCRIPTION

Figure 1:
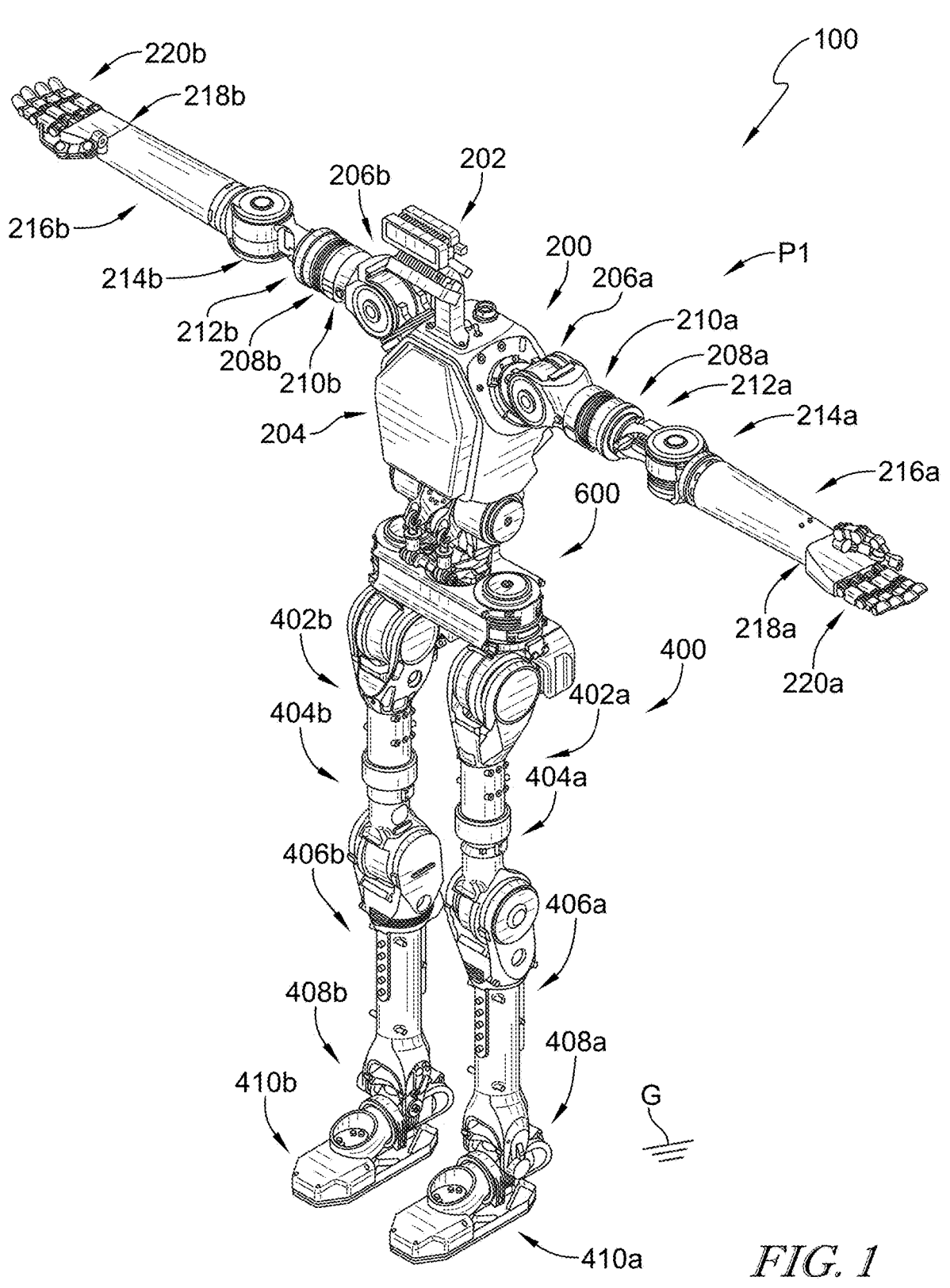
FIG. 1 is a perspective view of a humanoid robot in an upright, standing position P1 and including: (i) an upper region having the following parts: (a) a head/neck, (b) a torso, (c) left and right shoulders, (d) left and right upper arm assemblies that each include an upper humerus, lower humerus, upper forearms, and lower forearms, (e) left and right wrists, and (f) left and right hands, (ii) a lower region having the following parts: (a) left and right upper thighs, (b) left and right lower thighs, (c) left and right shins, (d) left and right talus, and (e) left and right feet; and (iii) a central region connecting the upper portion and the lower portion to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

In contrast to conventional robots, the humanoid robot 100 disclosed herein features a central region 600 that enhances both mobility and functionality. To achieve these improvements, as explained further below, the central region 600 includes several key components: upper actuator assemblies 606a and 606b, a spinal actuator assembly 610, a connector assembly 608 that functionally links the upper actuator assemblies 606a, 606b to the spinal actuator assembly 610, and an articulation member 604 connected to the connector assembly 608. This specific design results in an unconventional configuration, where the central region 600 occupies a larger portion of space in comparison with conventional configurations. Consequently, the size of the upper region 200 (specifically, the torso 204) is reduced, in comparison with conventional configurations, which in turn decreases the available internal storage space for components such as computer systems, communication modules, processors, batteries, and power distribution systems within that upper region 200.

The disclosed central region 600 is operably coupled between an upper region 200 of the robot 100 and a lower region 400 of the robot 100, wherein the central region 600 and the components thereof are configured to provide for and facilitate complex movements of the upper region 200 relative to the lower region 400. As explained below, the disclosed articulation member 604 provides (i) a first pivot or pivotal axis 604ap extending in a first direction, and (ii) a second pivot or pivotal axis 604bp extending in a second direction, wherein both the first and second pivotal axes 604ap, 604bp and their corresponding first and second directions are oriented orthogonally to each other, when the robot 100 is in the upright, standing position P1.

Furthermore, the spinal actuator assembly 610 establishes a third pivot or pivotal axis 610p extending in a third direction, wherein the third pivotal axis 610p is oriented orthogonally to both the first and second pivotal axes (604ap and 604bp), and the third direction is oriented orthogonally to both the first and second directions, when the robot 100 is in the upright, standing position P1. As shown in at least FIGS. 3, 6 and 7, which include a representative X, Y and Z Cartesian coordinate system for reference, the first pivotal axis 604ap extends generally in a first or Y direction (side-to-side), the second pivotal axis 604bp extends generally in a second or X direction (front-to-back), and the third pivotal axis 610p extends generally in a third or Z direction (vertical), wherein the X, Y and Z directions are orthogonally arranged relative to each other.

Figure 3:
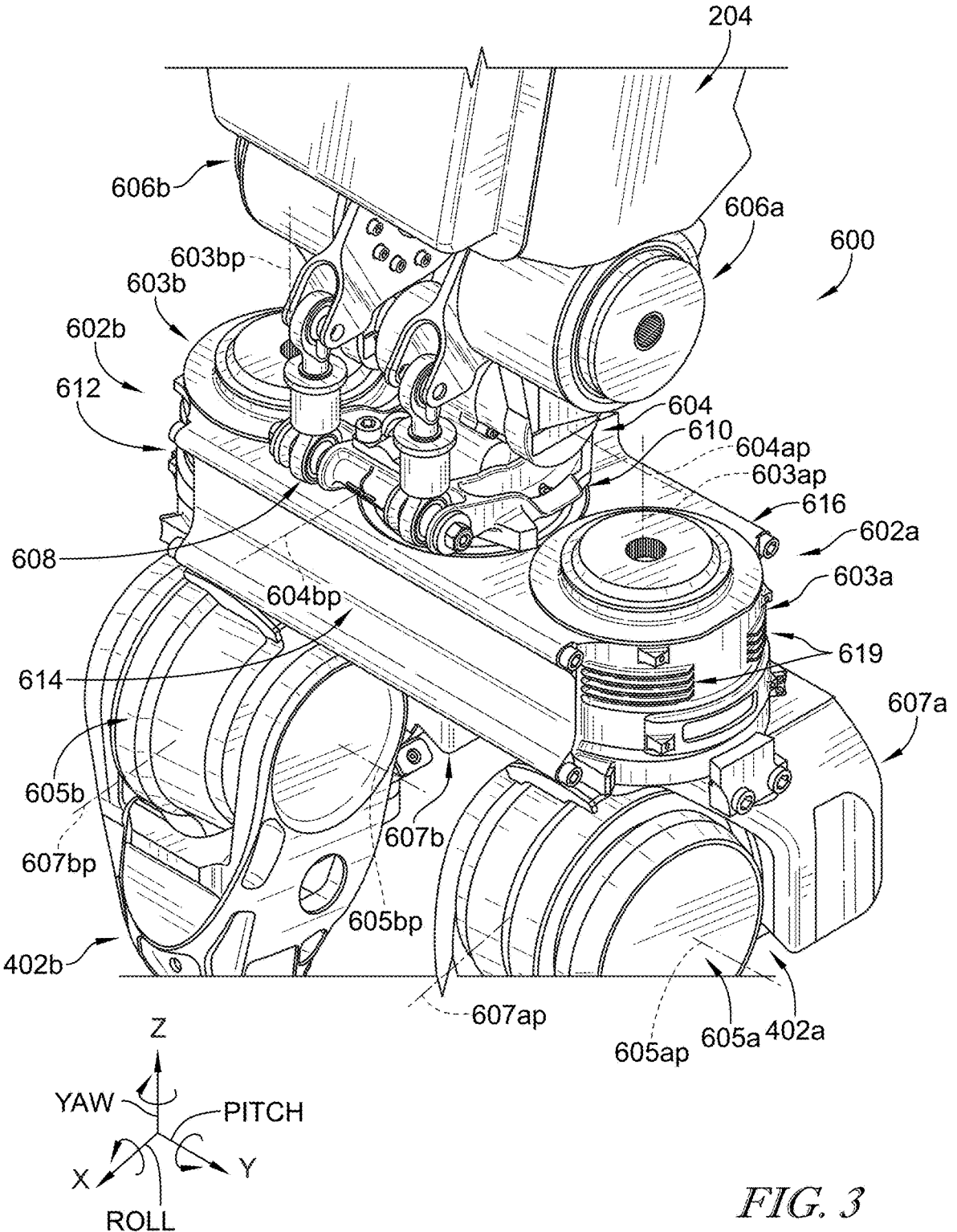
FIG. 3 is a first perspective view of a portion of the humanoid robot of FIG. 1 in the upright, standing position P1 and showing the central region including: (i) left and right hip actuator assemblies, (ii) an articulation member having a first pivotal axis and a second pivotal axis arranged orthogonal to each other (iii) left and right upper actuator assemblies coupled to the upper region, the articulation member and a spinal actuator assembly, and providing for articulation of the upper region about the first and second pivotal axes, (iv) a connector assembly coupled between the left and right upper actuator assemblies, the articulation member and the spinal actuator assembly, and including at least one connecting rod and an external linkage, (v) the spinal actuator assembly coupled to a front support frame member, a rear support frame member and the external linkage of the connector assembly, and providing for articulation of the upper region about a third pivotal axis arranged orthogonal to both the first pivotal axis and the second pivotal axis.
Figure 6:
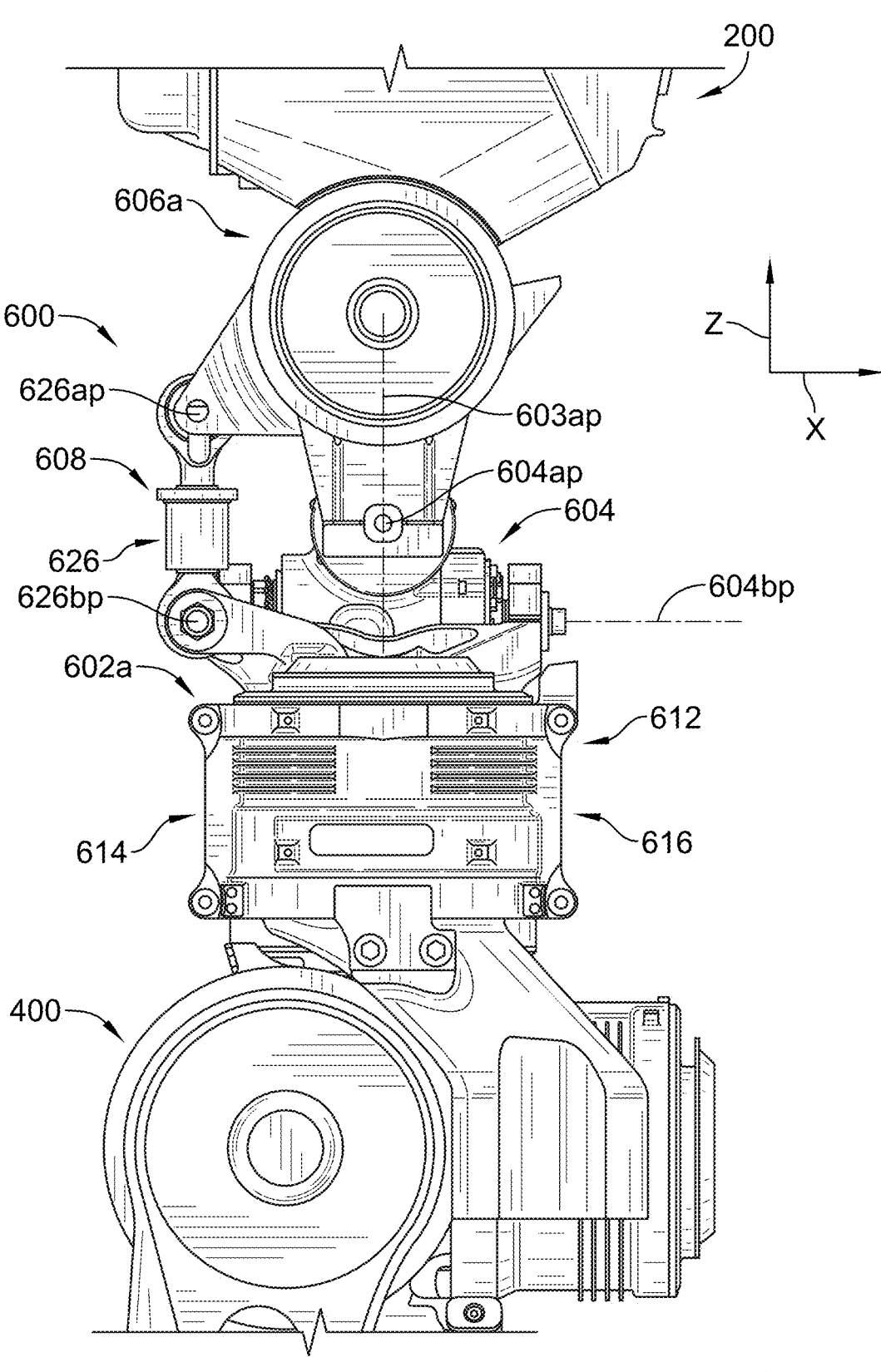
FIG. 6 is a side view of the central region of FIG. 3.
Figure 7:
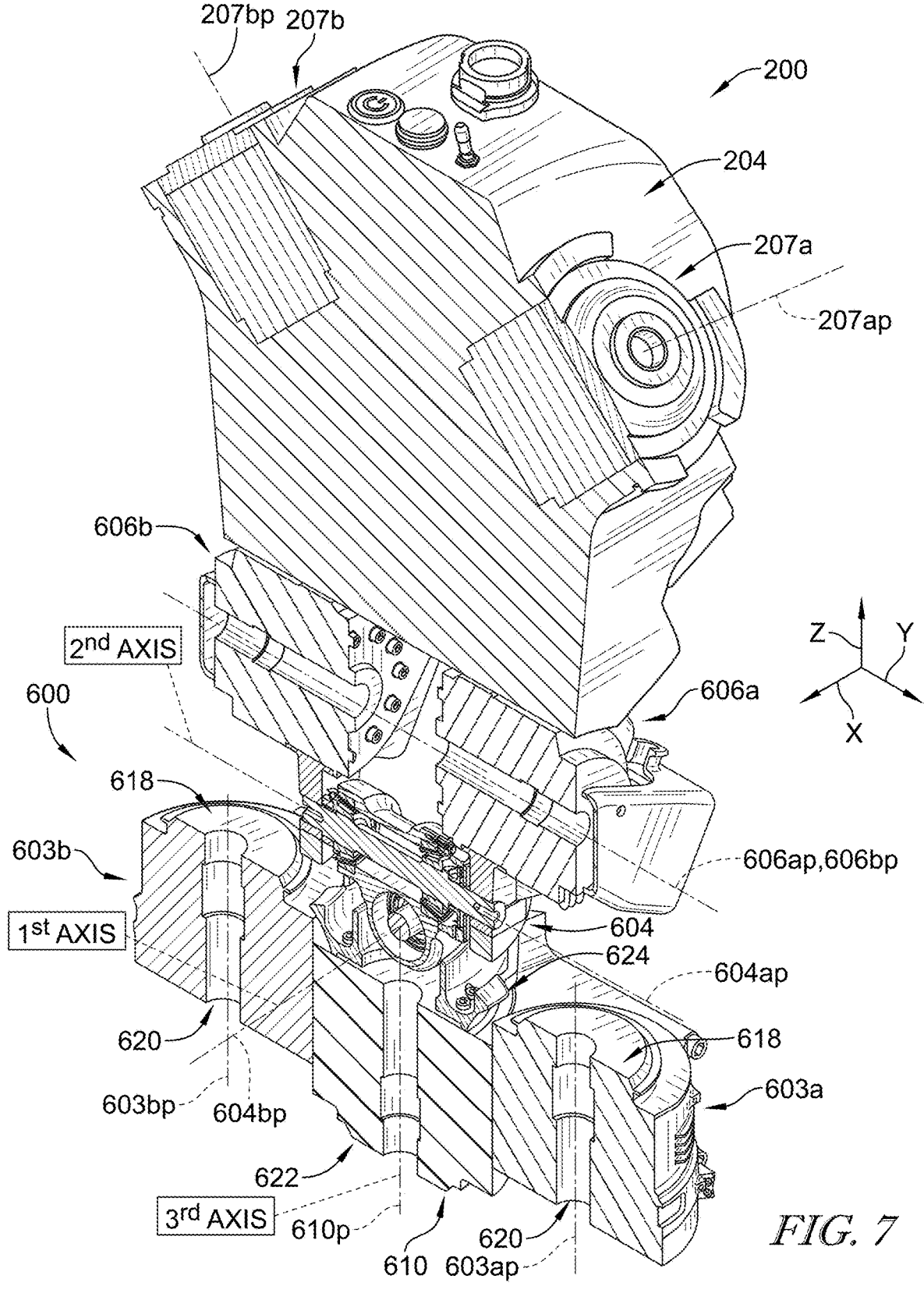
FIG. 7 is a first cross-sectional view, in an angled orientation, of the central region with portions of the left and right hip actuator assemblies omitted, and an extent of the upper region taken along the coronal plane of these two regions, showing the orthogonal orientation of the first, second and third pivotal axes when the humanoid robot is in the upright, standing position P1.

Referring again to the Figures, including FIGS. 3, 6 and 7, due to the unique arrangement of the various components within the central region 600 of the robot 100, in response to actuation of the upper actuator assemblies 606a, 606b, the upper region 200 can selectively perform movements such as (i) "pitch" (or "lean forward" or "lean backward") about the first pivotal axis 604ap that is collinear with the Y axis and relative to the lower region 400, and/or (ii) "roll" or (or "lean left" or "lean right") about the second pivotal axis 604bp that is collinear with the X axis and relative to the lower region 400. Furthermore, in response to actuation of the spinal actuator assembly 610, the upper region 200 can "twist" or "turn" in a "yaw" movement about the third pivotal axis 610p that is collinear with the Z axis, relative to the lower region 400. Importantly, the robot 100 can pivot about all three pivotal axes (604ap, 604bp, 610p) individually or simultaneously, allowing the robot 100 to assume a multitude of positions similar to those that most humans can assume and thereby perform varied tasks that involve complex movements or sequences of complex movements. These components and the movements they provide is unconventional compared to conventional robots that include certain arrangements of hip actuators because such movements, such as a forward leaning motion, can be accomplished by one of the actuators contained in the arrangement of hip actuators. Other conventional robots may omit these components to reduce the number of actuators, weight, and power draw of the robot.

A torso 204 of the robot 100 has a substantially rectangular lower base/bottom surface, as opposed to other conventional robots having a substantially "V-shaped" torso or portion thereof. The substantially rectangular lower base/bottom surface configuration of the torso 204 allows for a greater mounting surface/interface area for the coupling of the upper actuator assemblies 606a, 606b to the torso 204. Additionally, it should be understood that a lower portion of the torso 204 may have a modified cuboidal shape, wherein the edges of said cuboidal shape are rounded. As shown herein or in other embodiments, the torso 204 may take the shape of a modified rectangular prism, a cube, an oblique prism, a parallelepiped, a rhombic prism, or any other similar geometric shape.

The torso 204 also has a width 702 at its lower end, which is at least 65% of a width 704 of the robot's pelvic region 612. Again, this relatively wide torso base is not conventional because such a structure necessitates a substantial increase in the vertical gaps or spacing between the lower edge of the torso 204 and the pelvic region 612 in order to allow the robot 100 sufficient clearance to bend left or right (roll) about the axis 604bp; thus, increasing the overall height of the robot 100 or requiring the designer to reduce the height of other sections of said robot to maintain a target overall height.

While the disclosed central region 600 possesses an unconventional design that introduces certain potential drawbacks that are discussed above and/or may be obvious to one of skill in the art after reviewing the Figures of this Application, said central region 600 provides the robot 100 with many advantages over other conventional robots. As an example, the inventive robot 100 is able to at least closely mimic, and preferably mirror, the complex torso movements of most humans more accurately and with a greater range of motion compared to other conventional robots that lack such central articulation. Additionally, designing the robot 100 in a manner that allows it to bend along multiple axes at its waist or pelvis region 612 (as opposed to relying solely on hip joints for such torso orientation changes) enables the robot 100 to lean forward or pitch forward about the first pivotal axis 604ap more efficiently (e.g., reaching down into a bin) to pick up a component or part located below the central region 600. Further, the disclosed design of the robot 100, by decoupling torso pitch/roll/yaw from hip actuation, also allows for potentially reduced peak torque requirements for at least a portion of the hip actuator assemblies 602a, 602*b*, because the forward leaning motion (pitch) is not solely performed by those hip actuators 605*a*, 605*b*. In other words, the hip actuator assemblies 602*a*, 602*b* (controlling leg movements) and the other actuators (606*a*, 606*b*, 610) in the central region 600 (controlling torso orientation) can each perform their own distinct movements, often without kinematic reliance on one another for achieving basic orientations.

B. Robot Architecture

Figure 2:
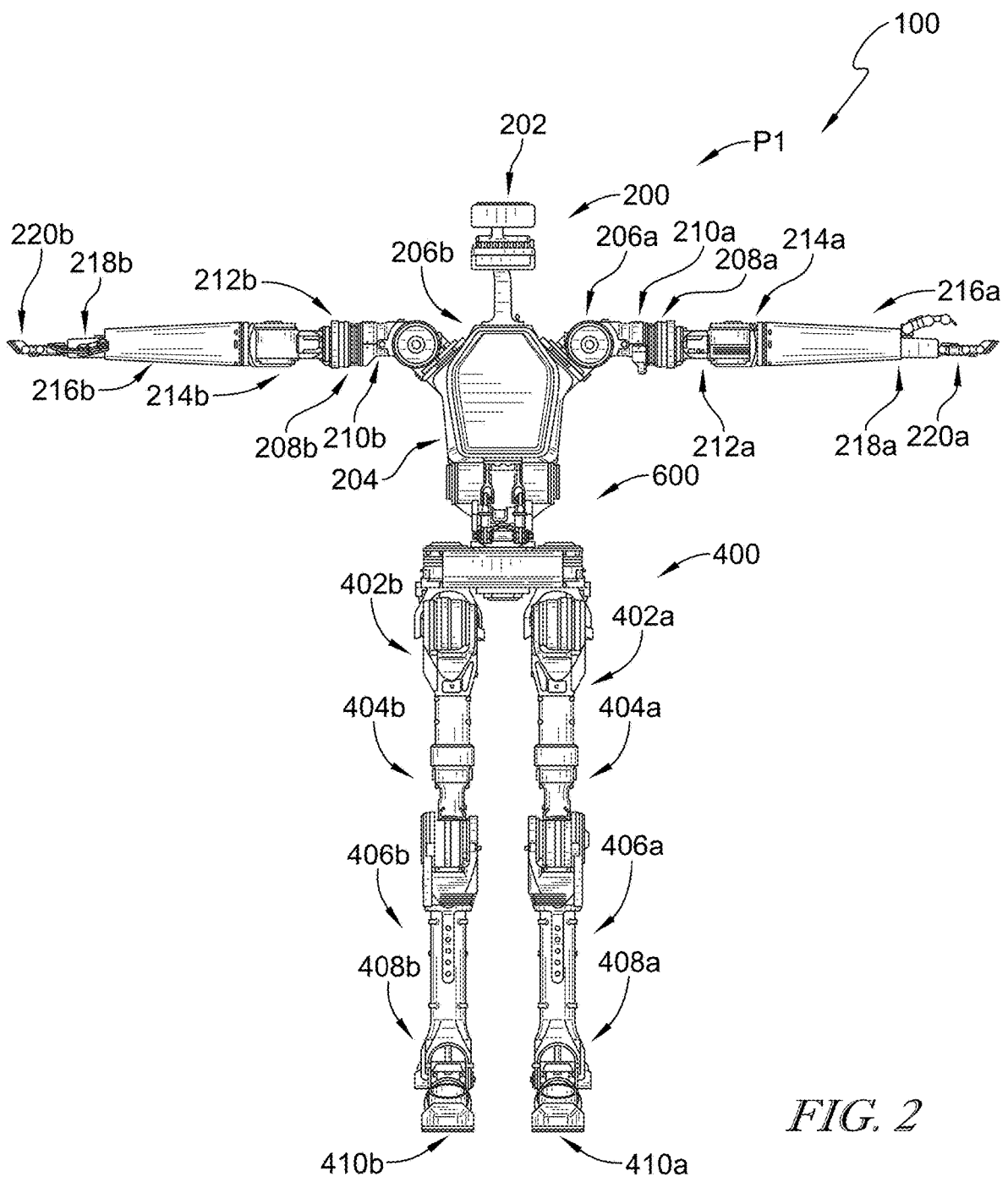
FIG. 2 is front view of the humanoid robot of FIG. 1.

Overall, the humanoid robot 100 is designed to have substantial similarities in form factor and anatomy to human beings, including many of the same major appendages that human beings possess. As previously introduced and shown in the Figures, the humanoid robot 100 includes an upper region 200, a lower region 400 spaced apart from the upper region 200, and a central region 600 interconnecting the upper region 200 and the lower region 400. The humanoid robot 100 is shown representatively in FIGS. 1 and 2 in an upright, standing position P1, where a pair of feet 410*a*, 410*b* of the lower region 400 are standing on a floor or ground surface G such that the lower region 400 supports the upper region 200 and the central region 600 above the floor G. Recognizing that in the specific upright, standing position P1 of FIGS. 1 and 2, the arms (e.g., 208*a*, 208*b*) of the robot 100 are outwardly extended in a nearly horizontal position; however, the arms could naturally be dropped such that they hang adjacent to respective sides of the upper region 200 while the robot maintains the fundamental upright, standing position P1 is retained.

The upper region 200 comprises: (a) a head/neck assembly 202, (b) a torso 204, (c) left and right shoulders 206*a*, 206*b*, (d) left and right upper arm assemblies 208*a*, 208*b* that each include an upper humerus 210*a*, 210*b*, a lower humerus 212*a*, 212*b*, an upper forearm 214*a*, 214*b*, and a lower forearm 216*a*, 216*b*, (e) left and right wrists 218*a*, 218*b*, and (f) left and right hands or mechanical end effectors 220*a*, 220*b*.

The head 202*a* may: (i) include a frontal visor or shield that is designed primarily to protect internal sensors and a screen disposed behind said visor or shield, (ii) inform a near-by human of its operational state (e.g., working, error, moving, etc.) using the lights that are shown on the side of its head 202*a* and are adjacent to the frontal visor or shield, and (iii) include an outer shell that may be manufactured using methods like injection molding or 3D printing, wherein said outer shell may include any known plastic or polymer material, including urethanes, PMMA, ABS, nylons, polyamides, etc.

The disclosed frontal visor or shield may occupy any portion or ratio of the robot's head 202*a* and may have any configuration. For instance, said visor may have a rear linear edge that is set to a forward angle (e.g., extending rearward from a horizontal plane) that is between 90 degrees and 140 degrees, preferably 110 degrees from horizontal when the robot 100 is in the upright, standing position P1. The frontal visor or shield may be made from any known material (e.g., glass, plastic, or another polymer) and may be curved in a single direction, curved in two directions (e.g., vertically and horizontally), or may possess a freeform design that may include multiple curves. In the depicted embodiment, the visor may not extend to the crown of the head 202*a*, and may not extend rearward past a location where a human's ears would typically be located. However, in other embodiments, the entire head 202*a* may be a shield, the shield may extend around rearward of the typical ear location, and/or the shield may extend past the crown of the head 202*a*. Fundamentally, the shield is designed to protect the internal sensors and electronics (e.g., a display screen) from environmental factors (e.g., dust). However, in other embodiments, said frontal visor or shield may be omitted and replaced with a monolithic screen a plurality of screens. In further alternative embodiments, said head 202*a* may include a combination of an exterior screen and shields that extend above and/or below said screen.

The disclosed screen may occupy a portion of the frontal visor or shield. In particular, said screen may extend horizontally from the left side of the head 202*a* to the right side of the head 202*a* and may have a vertical height that is approximately 5 inches tall. As such, there may be opaque areas on top and on bottom of the screen that are configured to obscure the view of sensors or other components disposed therein. In other embodiments, the screen may occupy a different proportion of the frontal visor or shield area, for instance: between 100% and 75%, between 75% and 50%, between 50% and 25%, or less than 25%. In other words, the ratio of screen size to frontal visor or shield size may be any ratio. The screen itself may be curved in a single (e.g., horizontal) direction. Said curvature of the screen may be greater than the curvature of the outer frontal shield or visor. In other alternative embodiments, the screen may be curved in two directions (e.g., vertically and horizontally), may be a freeform design that may include multiple curves, may have a curvature that is equal to the curvature of the shield, and/or have a curvature that is less than the curvature of the shield. In other embodiments, said screen may not extend fully from the left side of the head 202*a* to the right side of the head 202*a*, it may be taller than 5 inches, it may be shorter than 5 inches, may have a horizontal length that is greater or less than 10 inches, and/or have any other desirable configuration or aspect ratio. Functionally, said screen is configured to display information that may be helpful to a nearby human operator or observer, which includes conveying the robot's current state (e.g., working, error, moving, etc.). However, in the depicted embodiment, said screen may not be configured to display anthropomorphic or human-like features (e.g., animated eyes). Nevertheless, said robot 100 may be able to display other forms of information using emoticons, known symbols (e.g., a cone icon for danger, a battery level indicator, or a spinning circle for thinking/processing), and/or abstract communications perhaps using the square blocks shown on the screen.

The end effectors 220*a* and 220*b* may have any number of degrees of freedom (DOF) between 1 and 22, preferably between 14 and 20. For example, each finger of the end effectors 220*a*, 220*b* may have two knuckles, three knuckles, or any other number of knuckles. In certain embodiments, the end effectors 220*a*, 220*b* may include synthetic tendons that transverse an extent of the arm assembly 208*a*, 208*b* to enable the actuators associated with movements of the individual components of the end effector 220*a*, 220*b* to be positioned within the forearm (e.g., 214*a/b*, 216*a/b*) or even the humerus sections (e.g., 210*a/b*, 212*a/b*) of the robot 100. In other alternative embodiments, the end effectors 220*a*, 220*b* may not include synthetic tendons or pullies; instead, the actuators for driving the end effector's movements 220*a*, 220*b* may be contained within the structure of said end effector 220*a*, 220*b* itself and may drive finger movements via linkages (e.g., 4-bar linkage). Finally, components of the end effector 220*a*, 220*b* may be modular and swappable (and in certain embodiments hot-swappable) with one another.

The lower region 400 includes (a) left and right upper thighs 402*a*, 402*b*, (b) left and right lower thighs 404*a*, 404*b*, (c) left and right shins 406*a*, 406*b*, (d) left and right ankles or talus 408*a*, 408*b*, and (e) left and right feet 410*a*, 410*b*.

It is understood that each of the mobile components of the upper region 200 and the lower region 400 noted above includes at least one associated actuator configured to move the respective components relative to one another. The central region 600 is located generally in the area that provides, or corresponds to, a pelvis region of the humanoid robot 100 and, as previously mentioned, is specifically configured to allow complex movement of the upper and lower regions 200, 400 relative to one another in a three-dimensional manner.

C. Central Region

The central region 600 of the humanoid robot 100 is configured to provide and facilitate at least three types of movement-specifically pitch, roll, and/or yaw-either independently or simultaneously, allowing the upper region 200 to orient itself relative to the lower region 400 to substantially mimic such torso movements that most human beings are typically capable of during daily life activities.

As shown in FIG. 3, the central region 600 includes (i) left and right hip actuator assemblies 602a, 602b, (ii) an articulation member 604, (iii) left and right upper actuator assemblies 606a, 606b (iv) a connector assembly 608, and (v) a spinal actuator assembly 610. The left and right hip actuator assemblies 602a, 602b are coupled, receptively, to the left and right upper thighs 402a, 402b of the lower region 400 and are configured primarily to control pivotal movement of the left and right upper thighs 402a, 402b about at least one hip Z actuator axis 603ap, 603bp, respectively (hip yaw), relative to the upper region 200 and central region 600. The articulation member 604 is centrally located and includes provisions for a first pivotal axis 604ap extending in a first direction, or Y-direction (side-to-side, enabling pitch), and a second pivotal axis 604bp positioned below the first pivotal axis 604ap and extending in a second direction, or X-direction, perpendicular to the first direction such that the first and second pivotal axes 604ap, 604bp are arranged orthogonally to each other. The left and right upper actuator assemblies 606a, 606b: (i) are coupled to the upper region 200, the articulation member 604, and the spinal actuator assembly 610, and (ii) These upper actuator assemblies 606a, 606b function to provide for articulation of the upper region 200 about the first (pitch) pivotal axis 604ap and the second (roll) pivotal axis 604bp. The connector assembly 608 is coupled functionally between the left and right upper actuator assemblies 606a, 606b and the spinal actuator assembly 610 to synchronize or coordinate the movement of the left and right upper actuator assemblies 606a, 606b with the rotational movement of the spinal actuator assembly 610. The spinal actuator assembly 610 is itself configured to control the yaw movement of: (i) the upper region 200, (ii) the articulation member 604, and (iii) the connector assembly 608, all rotating together about a third pivotal axis 610p extending in a third direction, defined herein as the Z-direction (vertical), which is arranged orthogonally to both the first pivotal (pitch) axis 604ap and the second pivotal (roll) axis 604bp when the humanoid robot 100 is in the reference upright, standing position P1.

a. Left and Right Hip Actuator Assemblies

The left and right hip actuator assemblies 602a, 602b are mounted mechanically between a pelvic housing structure 612 and the respective left and right upper thighs 402a, 402b. Each hip actuator assembly 602a, 602b comprises a multi-axis system including: (i) left and right first hip actuators, also referred to as hip Z actuators, or hip yaw actuators 603a, 603b, (ii) left and right second hip actuators, also referred to as hip X actuators, or hip roll actuators 607a, 607b, and (iii) left and right third hip actuators, also referred to as hip Y actuators, or hip pitch actuators 605a, 605b. The first hip actuators 603a, 603b are configured to move each respective upper thigh 402a, 402b about a corresponding first hip axis or hip Z axis 603ap, 603bp (providing leg yaw/twist). The second hip actuators 607a, 607b are configured to move each respective upper thigh 402a, 402b about a respective second hip axis or a hip X axis 607ap, 607bp (providing leg roll/abduction/adduction). The third hip actuators 605a, 605b are configured to move each respective upper thigh 402a, 402b about a respective third hip axis or hip Y axis 605ap, 605bp (providing leg pitch/flexion/extension). Within each hip assembly, the hip Z axes 603ap, 603bp, 607ap, 607bp, 605ap, 605bp are arranged orthogonally to one another in at least one reference orientation, providing three degrees of freedom for each leg relative to the pelvic housing 612.

The first hip actuators 603a, 603b (hip Z/yaw) are the uppermost hip actuators included in each hip actuator assembly 602a, 602b as shown in FIG. 3. The first hip actuators, or left and right hip Z actuators 603a, 603b, control the twist or yaw rotation of each respective leg (including upper thigh 402a, 402b) about the vertical Z-axis (specifically axes 603ap, 603bp). The second hip actuators, or left and right hip X actuators 607a, 607b, are coupled to the output of each respective first hip actuator 603a, 603b and control the roll motion of each respective leg about the generally front-to-back X-direction (specifically axes 607ap, 607bp). In other words, actuation of the second hip actuators 607a, 607b allows the legs (e.g., 402a, 402b) to kick out laterally to the right or left (i.e., moving toward or away from one another, representing abduction/adduction, when the legs are both facing generally forward). The third hip actuators, or left and right hip Y actuators 605a, 605b, are coupled to the output of each respective second hip actuator 607a, 607b and control the pitch motion of each respective leg about the generally side-to-side Y-direction (specifically axes 605ap, 605bp). In other words, actuation of the third hip actuators 605a, 605b allows each leg (e.g., 402a, 402b) to kick forward (flexion) and aft (extension) relative to the pelvic housing 612.

The pelvic housing 612 includes a front support frame member 614 and a rear support frame member 616 as shown in FIGS. 3-6. Each hip actuator assembly 602a, 602b includes at least the first hip actuator 603a, 603b having a stationary part or hip stator 618 coupled securely to the pelvic housing 612 and a rotating part or hip rotor 620 configured to be moved in pivotal motion about each respective hip Z actuator axis 603ap, 603bp by the electromagnetic interaction with the hip stator 618. Each first hip actuator 603a, 603b is coupled to the pelvic housing 612 and is arranged structurally between the front and rear support frame members 614, 616. In certain embodiments, the hip actuator 603a, 603b may only be coupled to the rear support frame member 616. In other embodiments, the pelvic housing 612 may be more robust than the front and rear support frame members 614, 616; instead, said housing 612 may substantially surround and house the hip Z actuators 603a, 603b and the spinal actuator assembly 610. The hip rotors 620 are illustratively embodied as hollow tubes or structures, which can provide internal cavities or passageways for electrical wires and cables to run therethrough and connect with the next actuator in the kinematic chain of the leg. This internal wire routing can reduce the amount of exterior cabling throughout the robot 100 and makes the robot 100 more durable while maintaining operating life. The hip stators 618 and hip rotors 620 can establish a brushed or brushless configuration.

Figure 4:
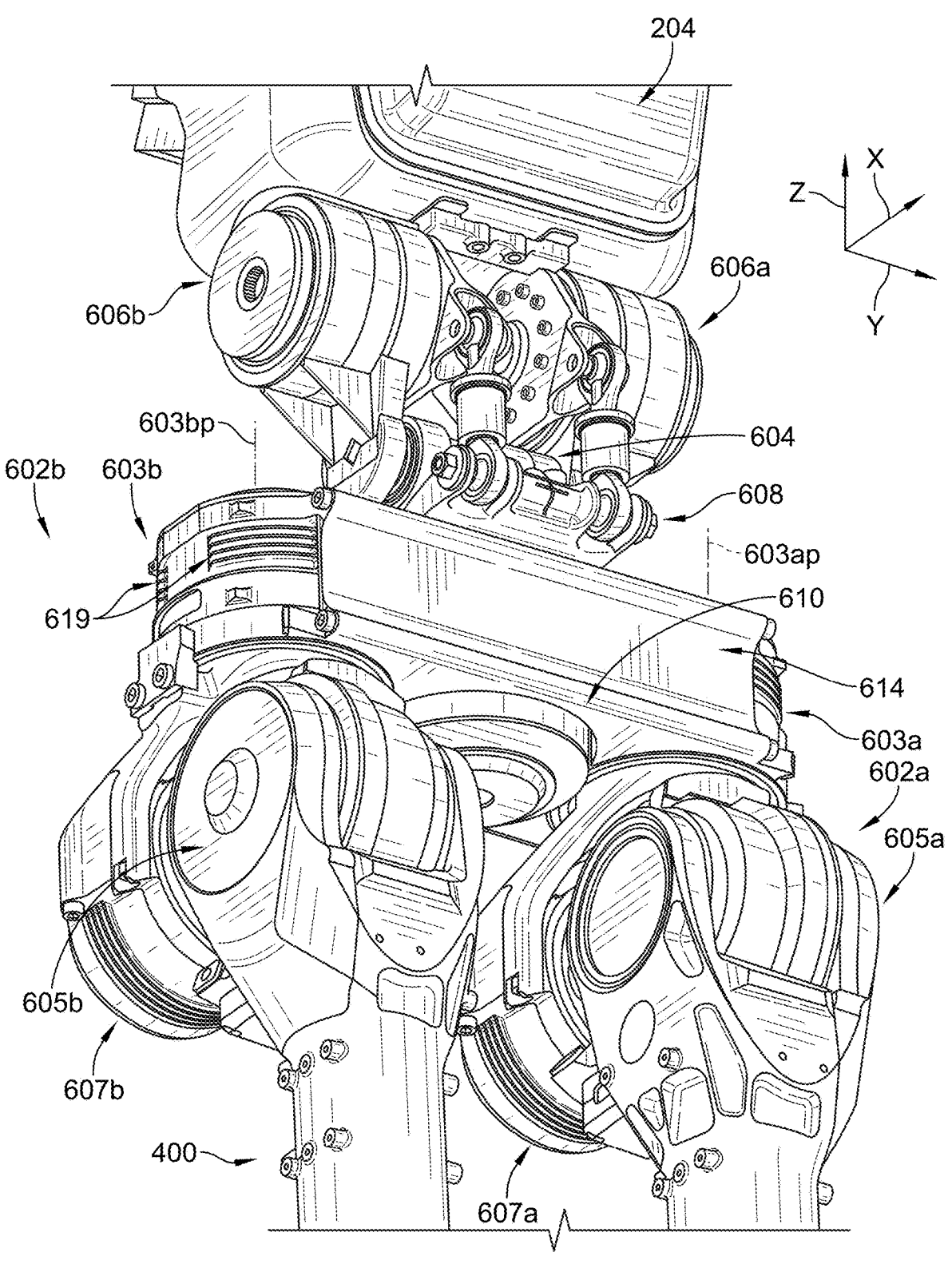
FIG. 4 is a second perspective view of the central region of FIG. 3, showing: (i) left and right hip actuator assemblies, (ii) the articulation member, (iii) the left and right upper actuator assemblies coupled to the upper region, the articulation member and the spinal actuator assembly, and (iv) the spinal actuator assembly coupled to the front and rear support frame members, the articulation member, and the left and right upper actuator assemblies via at least one connecting rod and the external linkage.

The hip Z actuator axes 603*ap*, 603*bp* extend in the Z-direction (vertical) and are oriented parallel to the third pivotal or spine Z axis 610*p* established by the spinal actuator assembly 610, as shown clearly in the perspective views of FIGS. 3 and 4. The spinal actuator assembly 610 is located laterally between the first hip actuators 603*a*, 603*b*, effectively positioning each hip Z actuator axis 603*ap*, 603*bp* on respective sides (left and right) of the central spinal actuator assembly 610 and the main body of the pelvic housing 612. Notably, the hip Z actuator axes 603*ap*, 603*bp* do not intersect the articulation member 604, at least not when the robot 100 is in the upright, standing position P1. In some embodiments, the hip Z actuator axes 603*ap*, 603*bp* may be oriented at an angle (e.g., splayed outward or inward) relative to the third pivotal axis 610*p*, wherein said angle may be positive or negative relative to the vertical Z-direction.

Figure 8:
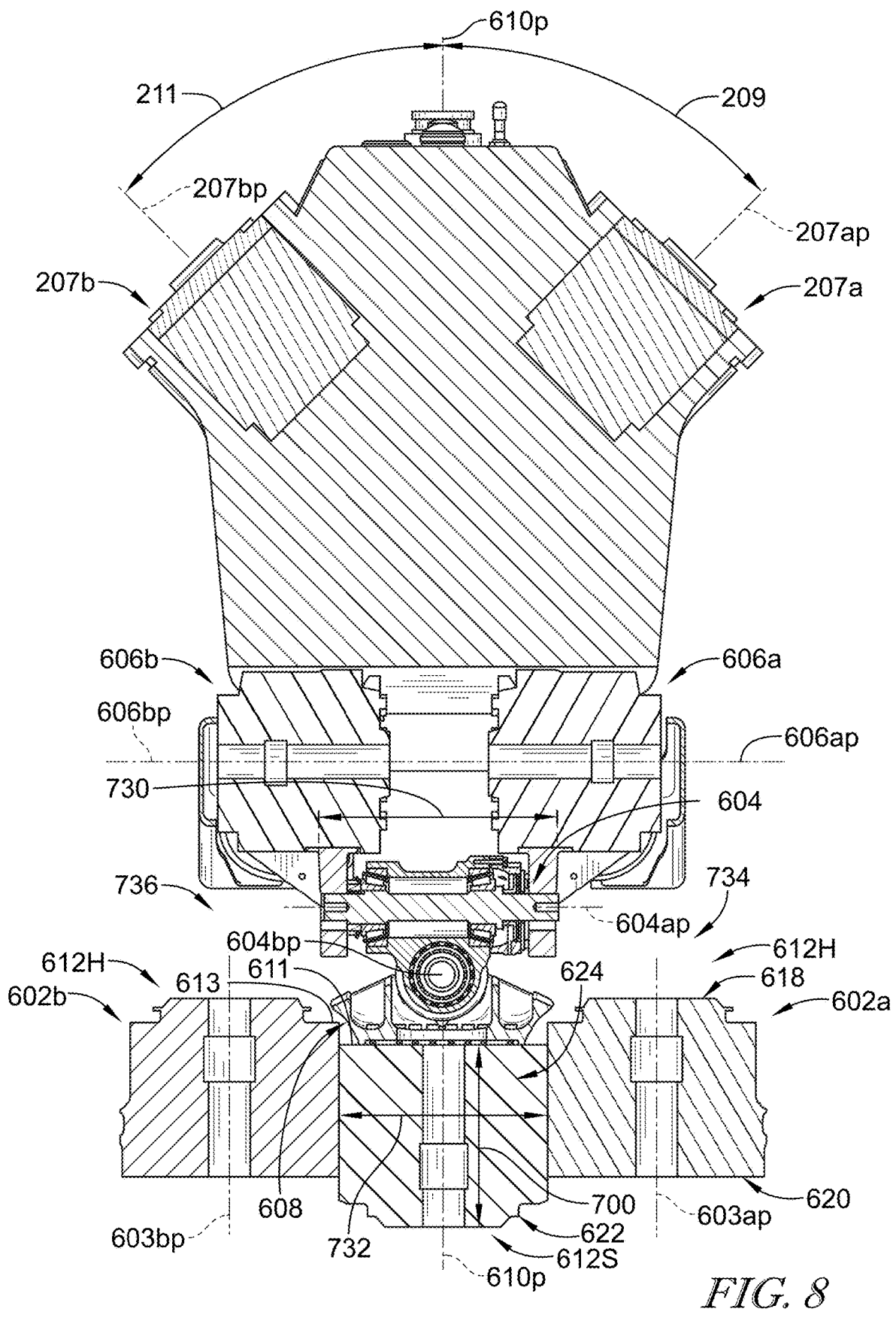
FIG. 8 is a second cross-sectional view of the central region with portions of the left and right hip actuator assemblies omitted, and an extent of the upper region taken along the coronal plane of these two regions.
Figure 9:
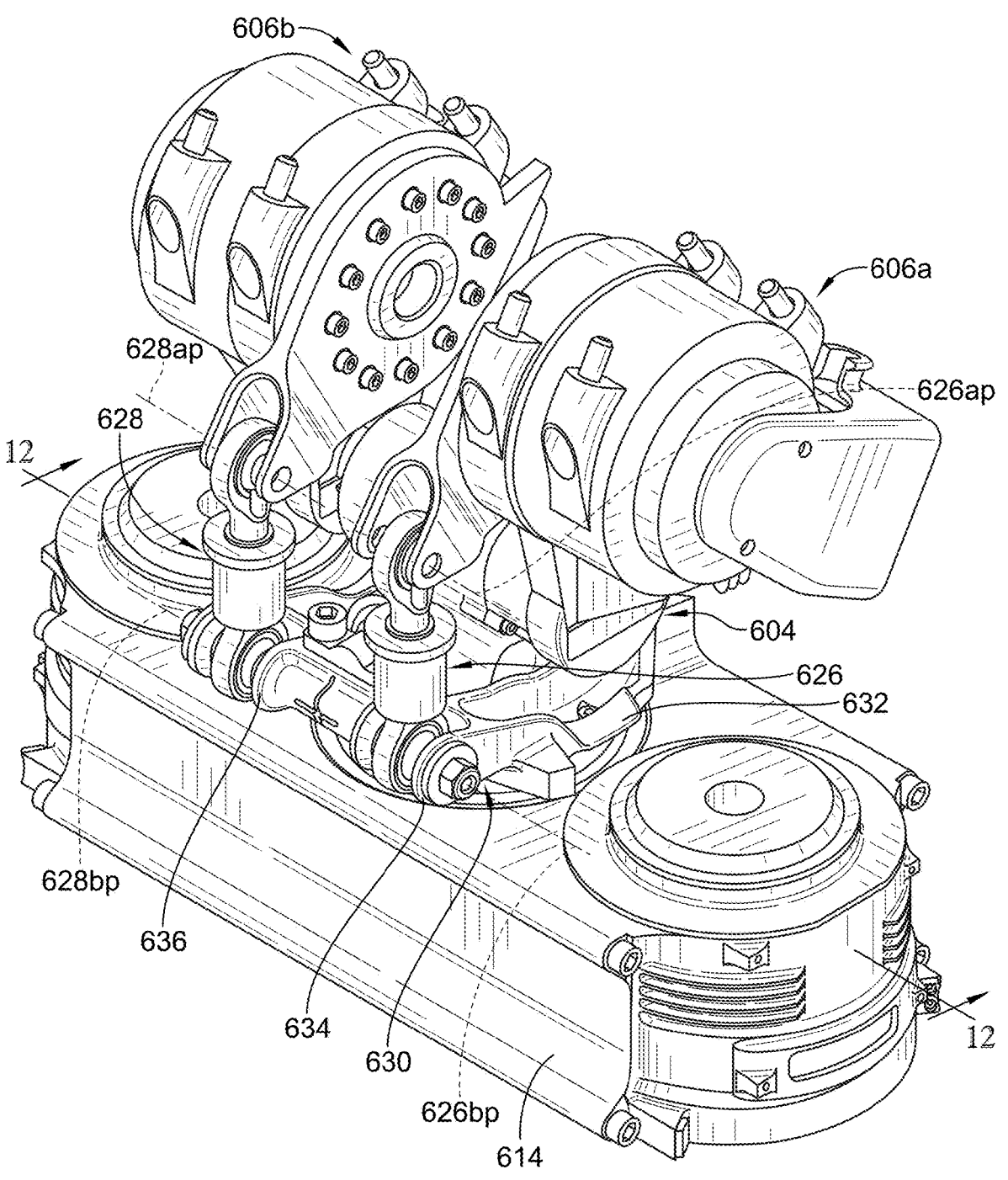
FIG. 9 is a frontal, perspective view of the central region of FIG. 3 with portions of the left and right hip actuator assemblies omitted.
Figures 10, 11:
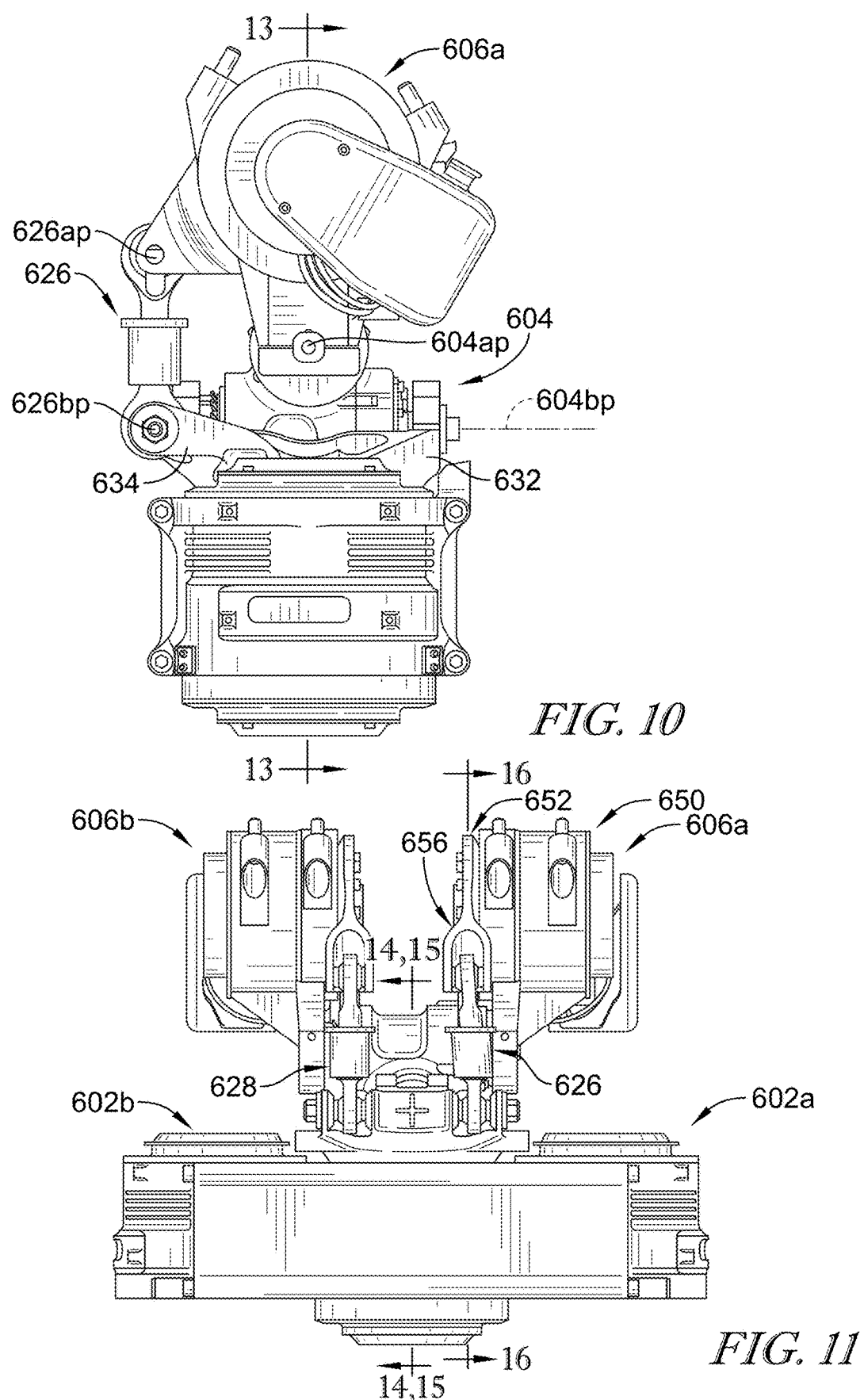
FIG. 10 is a side view of the central region of FIG. 3 with portions of the left and right hip actuator assemblies omitted.
FIG. 11 is a front view of the central region of FIG. 3 with portions of the left and right hip actuator assemblies omitted.
Figure 12:
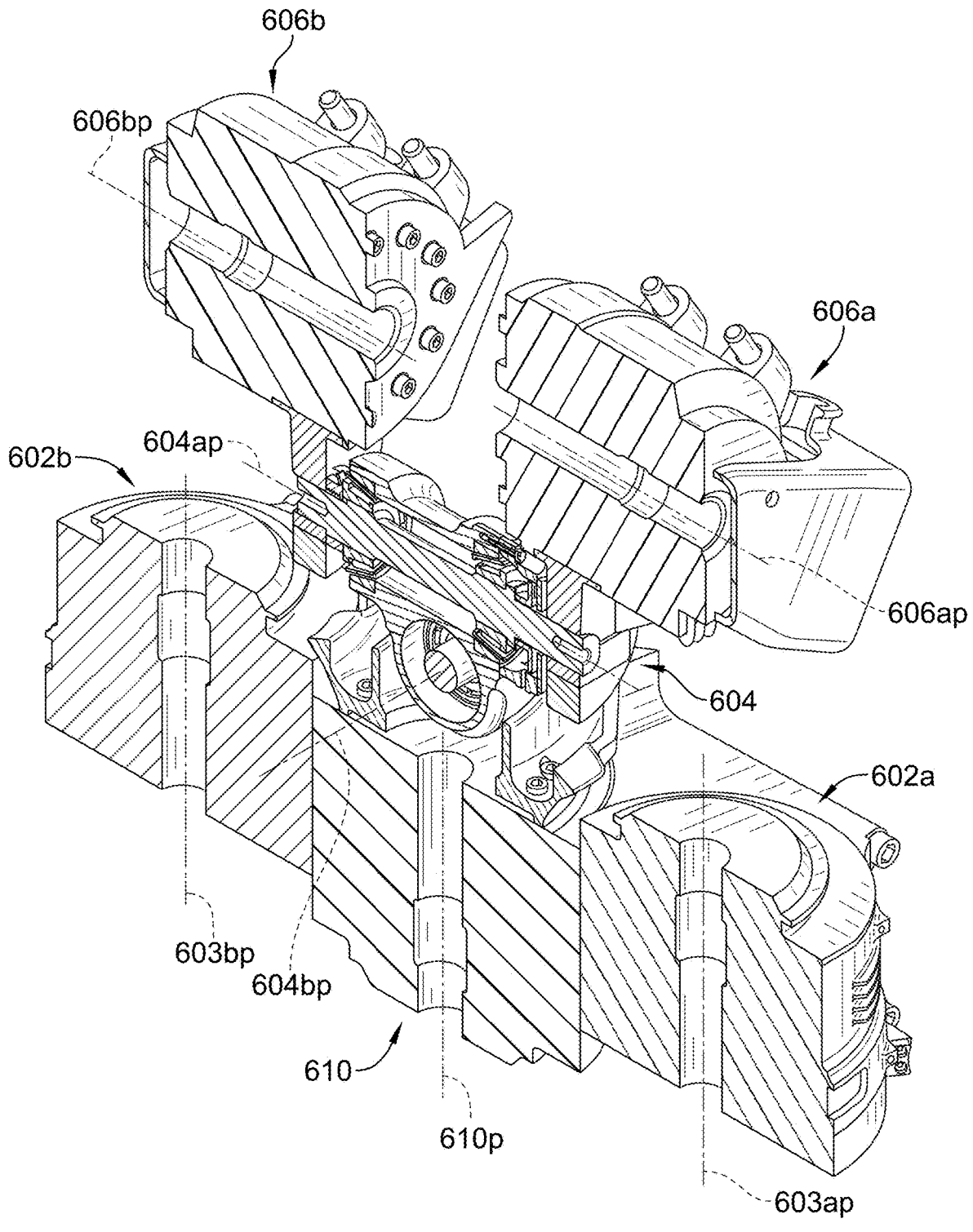
FIG. 12 is a cross section of the central region, in an angled orientation and with portions of the left and right hip actuator assemblies omitted, taken along line 12-12 in FIG. 9, showing the orthogonal orientation of the first, second and third pivotal axes when the humanoid robot is in the upright, standing position P1.
Figure 13:
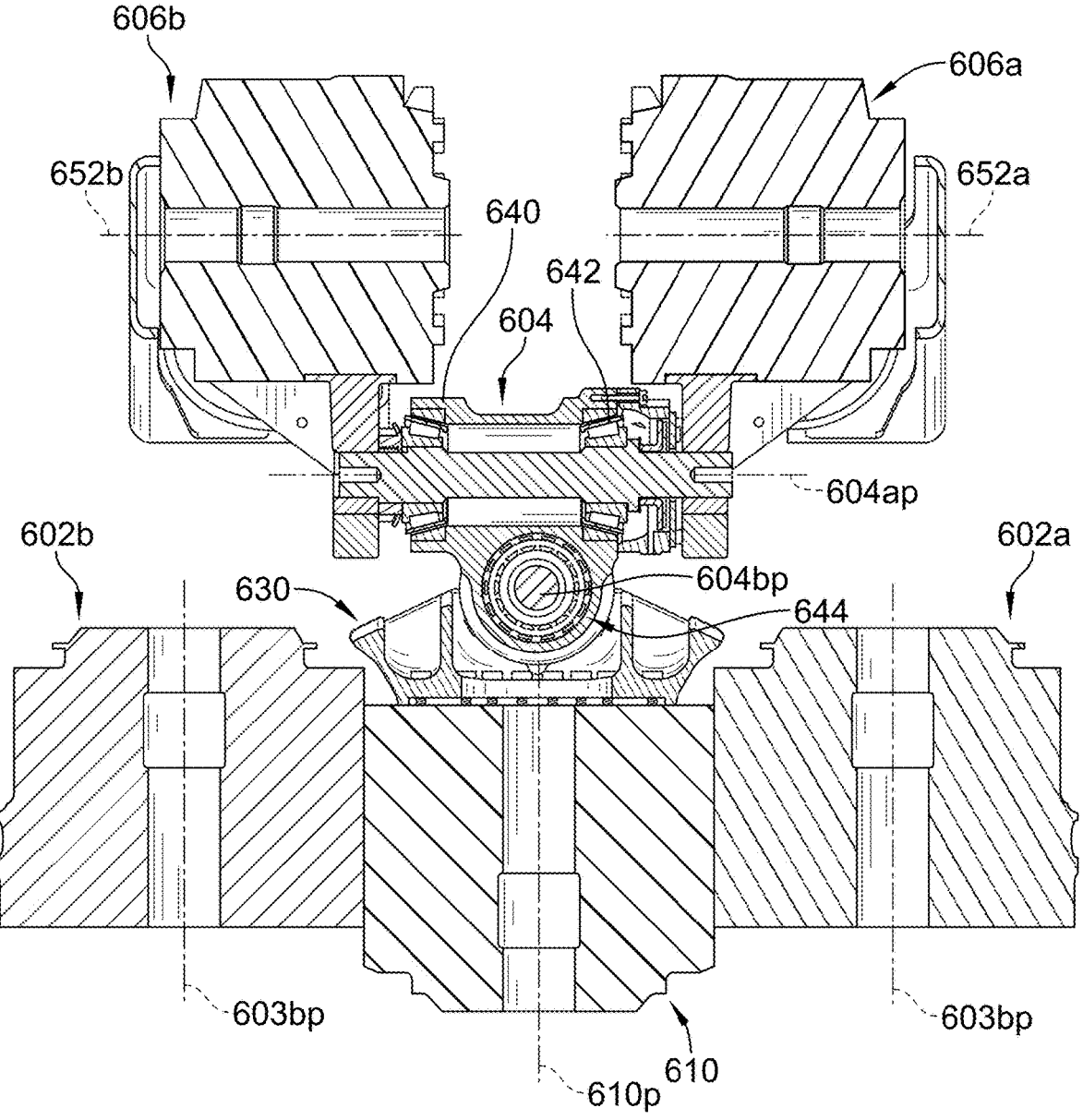
FIG. 13 is a cross section of the central region, with portions of the left and right hip actuator assemblies omitted, taken along line 13-13 in FIG. 10 showing the orthogonal orientation of the first, second and third pivotal axes when the humanoid robot is in the upright, standing position P1.
Figure 14:
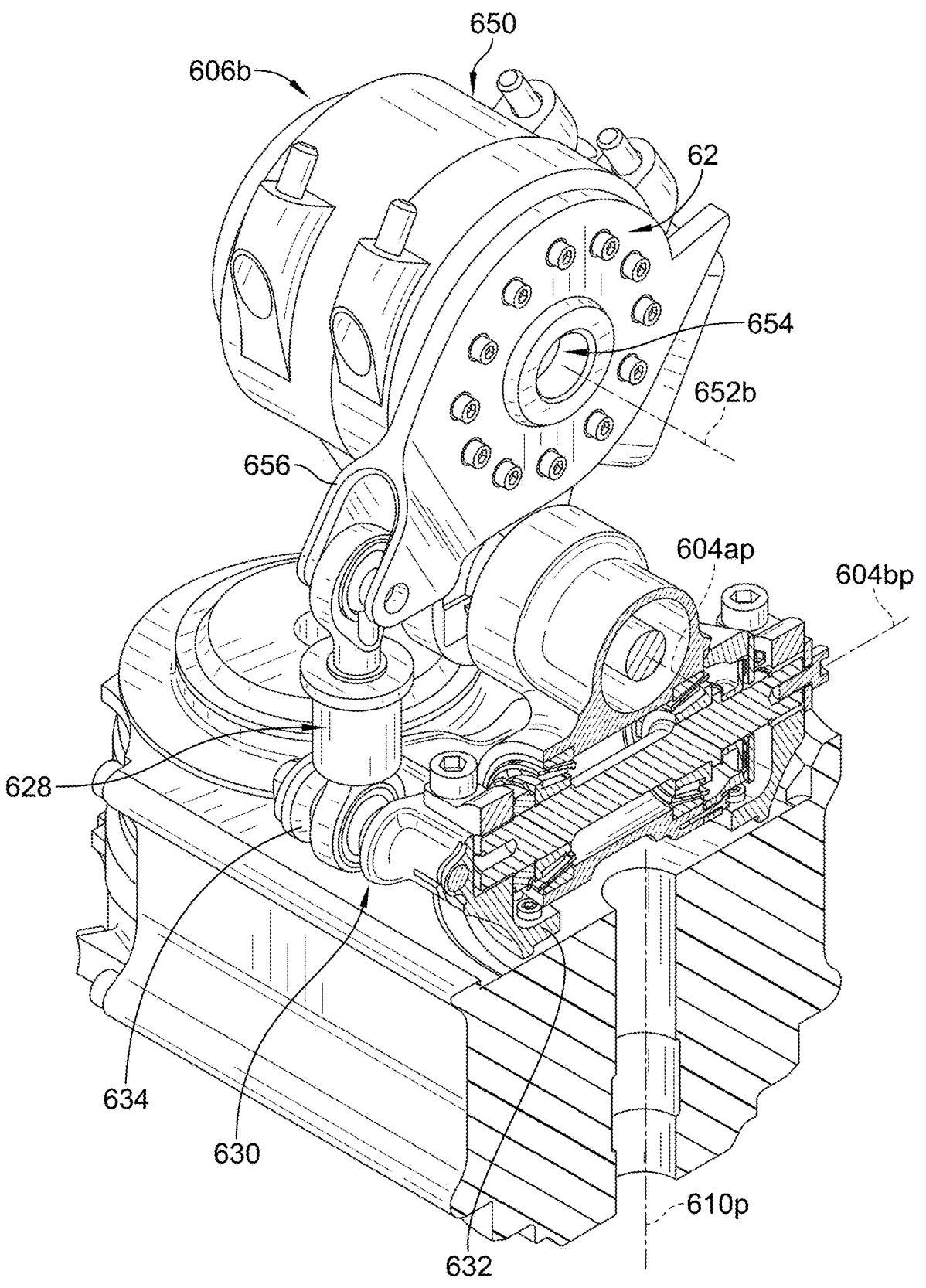
FIG. 14 is a cross section view of the central region, in an angled orientation and with portions of the left and right hip actuator assemblies omitted, taken along line 14-14 in FIG. 11, showing the orthogonal orientation of the first, second and third pivotal axes when the humanoid robot is in the upright, standing position P1.
Figure 15:
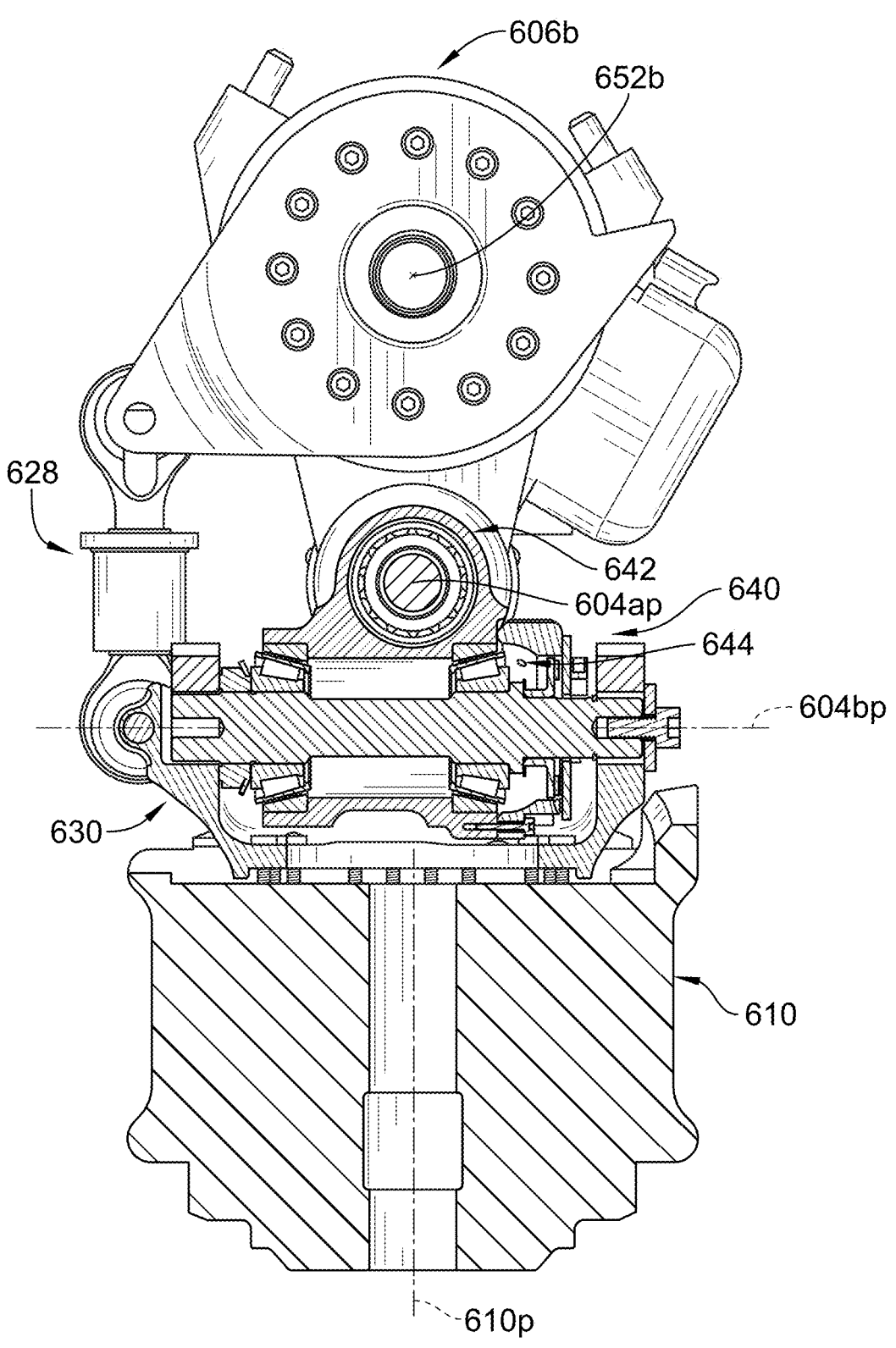
FIG. 15 is a cross section of the central region, with portions of the left and right hip actuator assemblies omitted, taken along line 15-15 in FIG. 11 showing the orthogonal orientation of the first, second and third pivotal axes when the humanoid robot is in the upright, standing position P1.
Figure 16:
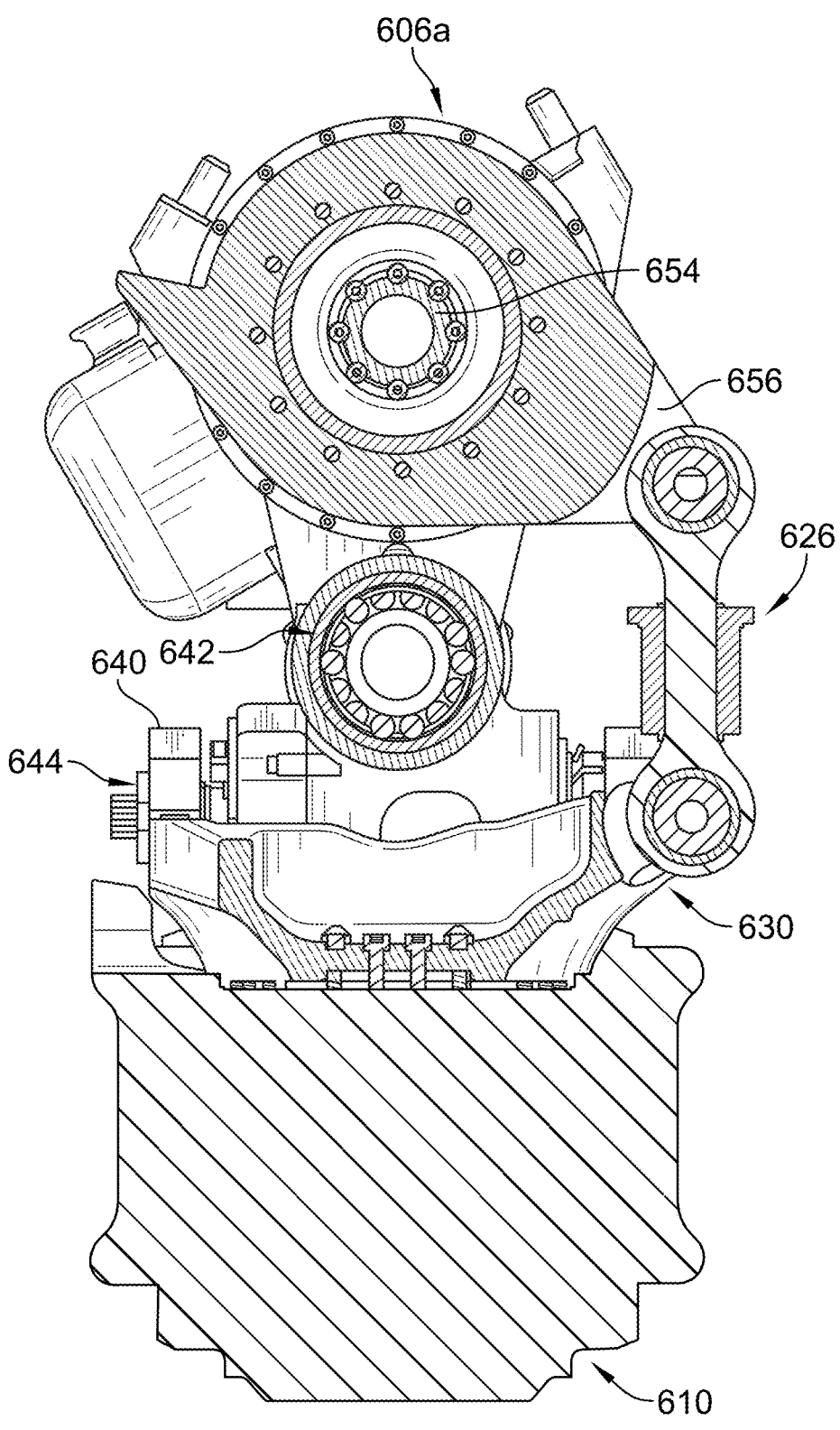
FIG. 16 is a cross section of the central region, with portions of the left and right hip actuator assemblies omitted, taken along line 16-16 in FIG. 11 that bisects a connecting rod, whereby the section plane is offset from the mid-point of the central region such that it is not bisected.
Figure 17:
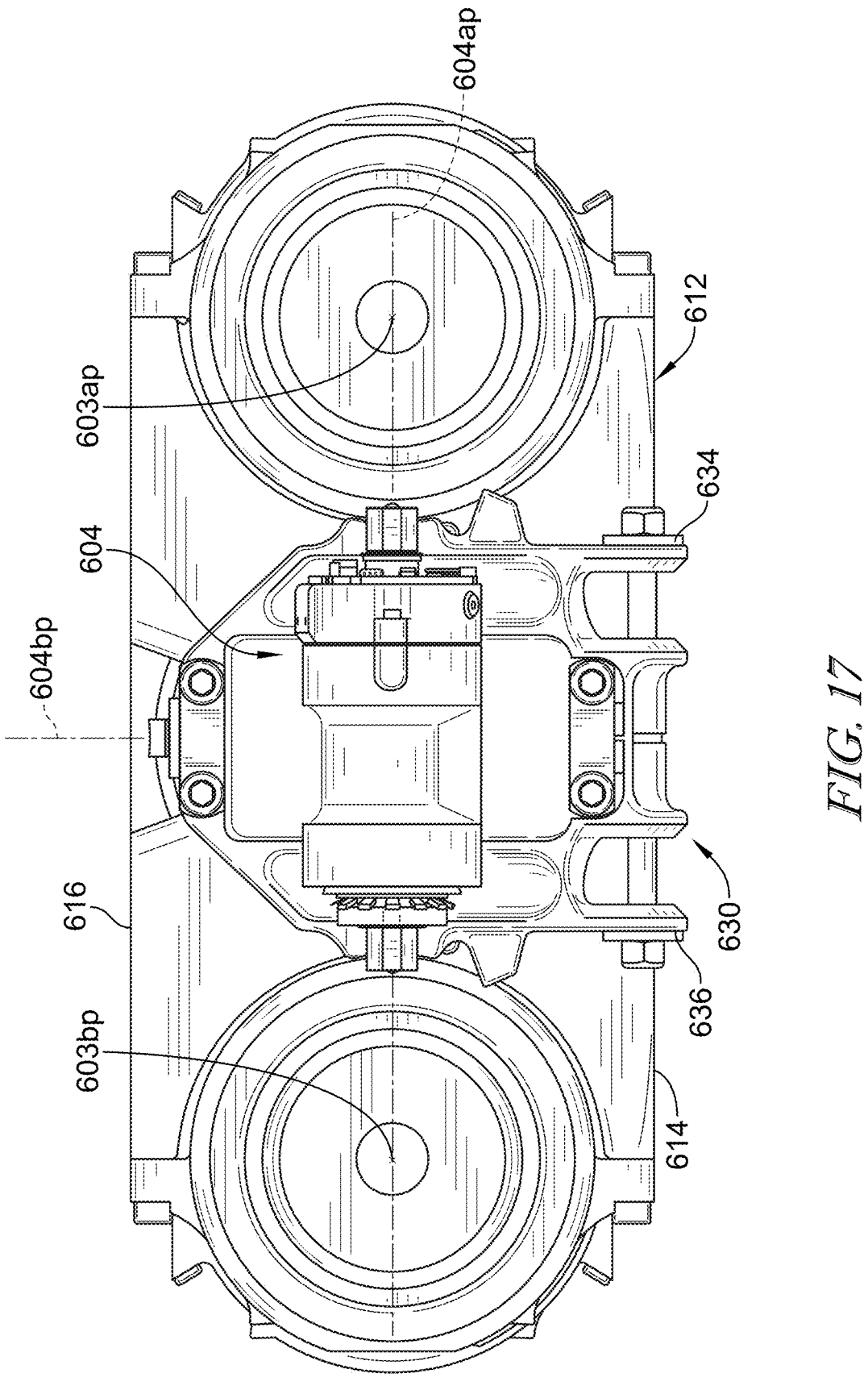
FIG. 17 is a top view of the central region of FIG. 3 with portions of the left and right hip actuator assemblies omitted, showing the left and right hip actuator assemblies but omitting the left and right upper actuator assemblies and the connecting rods of the connector assembly.
Figure 18:
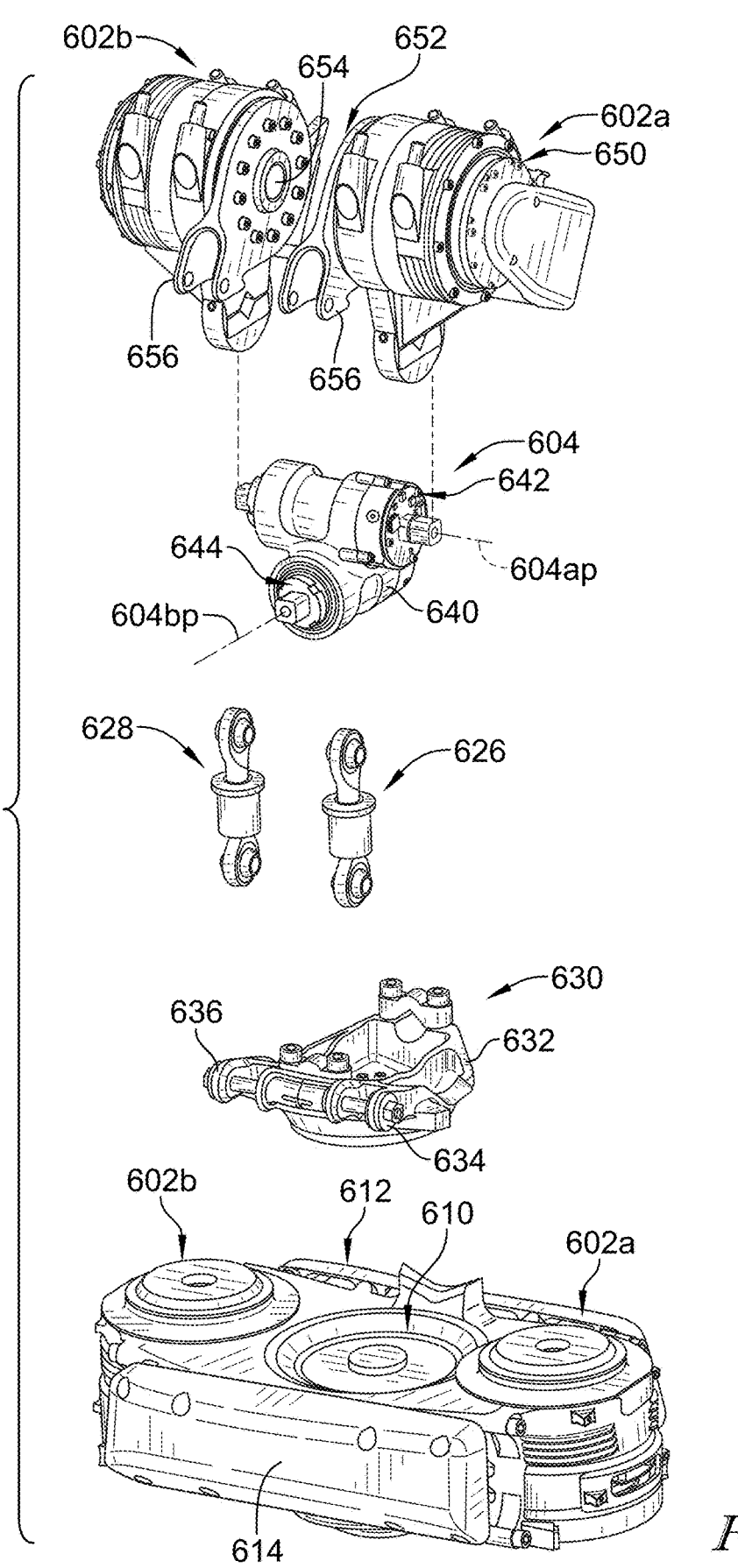
FIG. 18 is an exploded assembly view showing the primary components of the central region of FIG. 3.
Figures 19, 20:
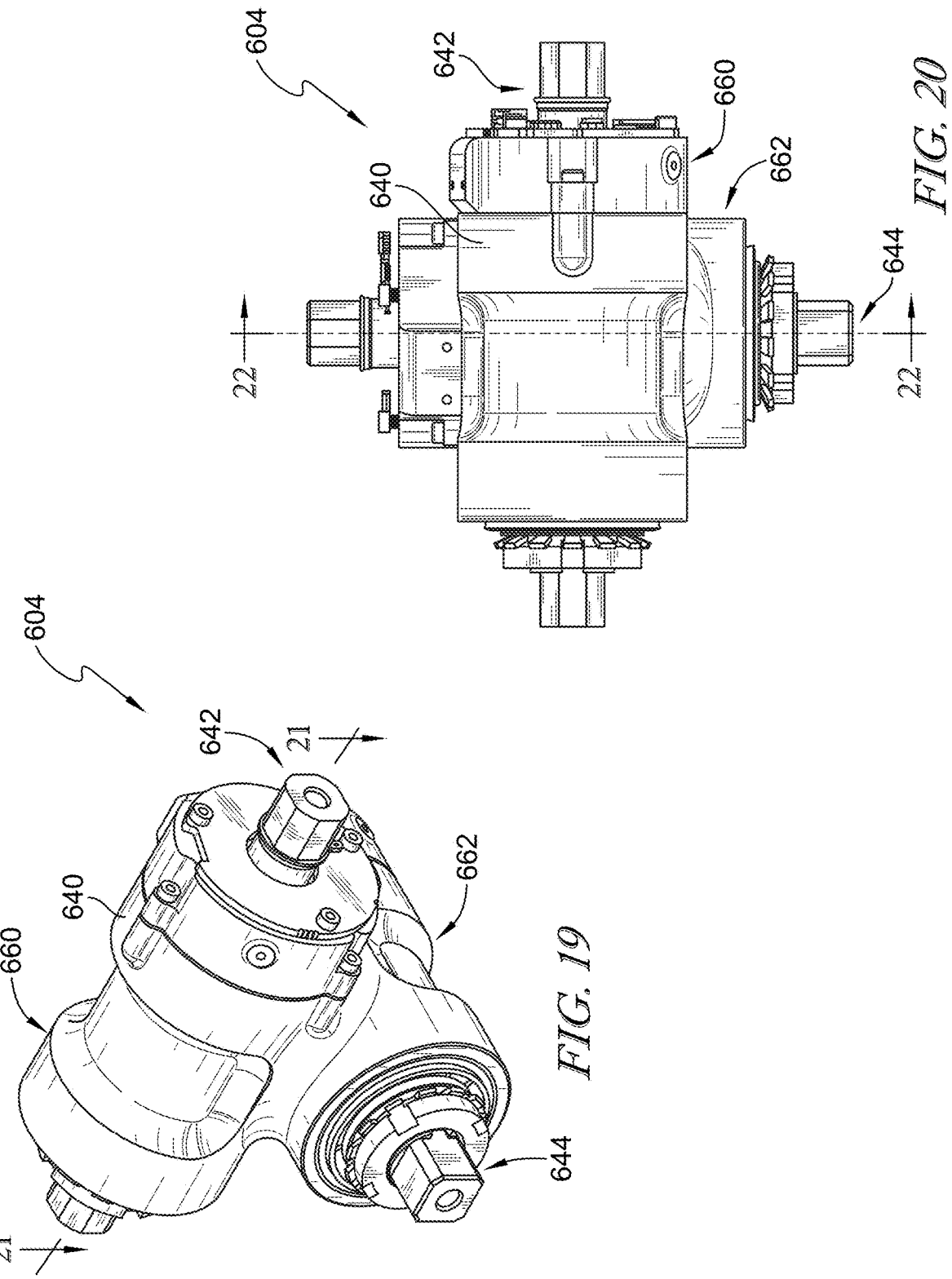
FIG. 19 is a perspective view of the articulation member of the central region of FIG. 3.
FIG. 20 is a top view of the articulation member of FIG. 19.
Figures 21, 22:
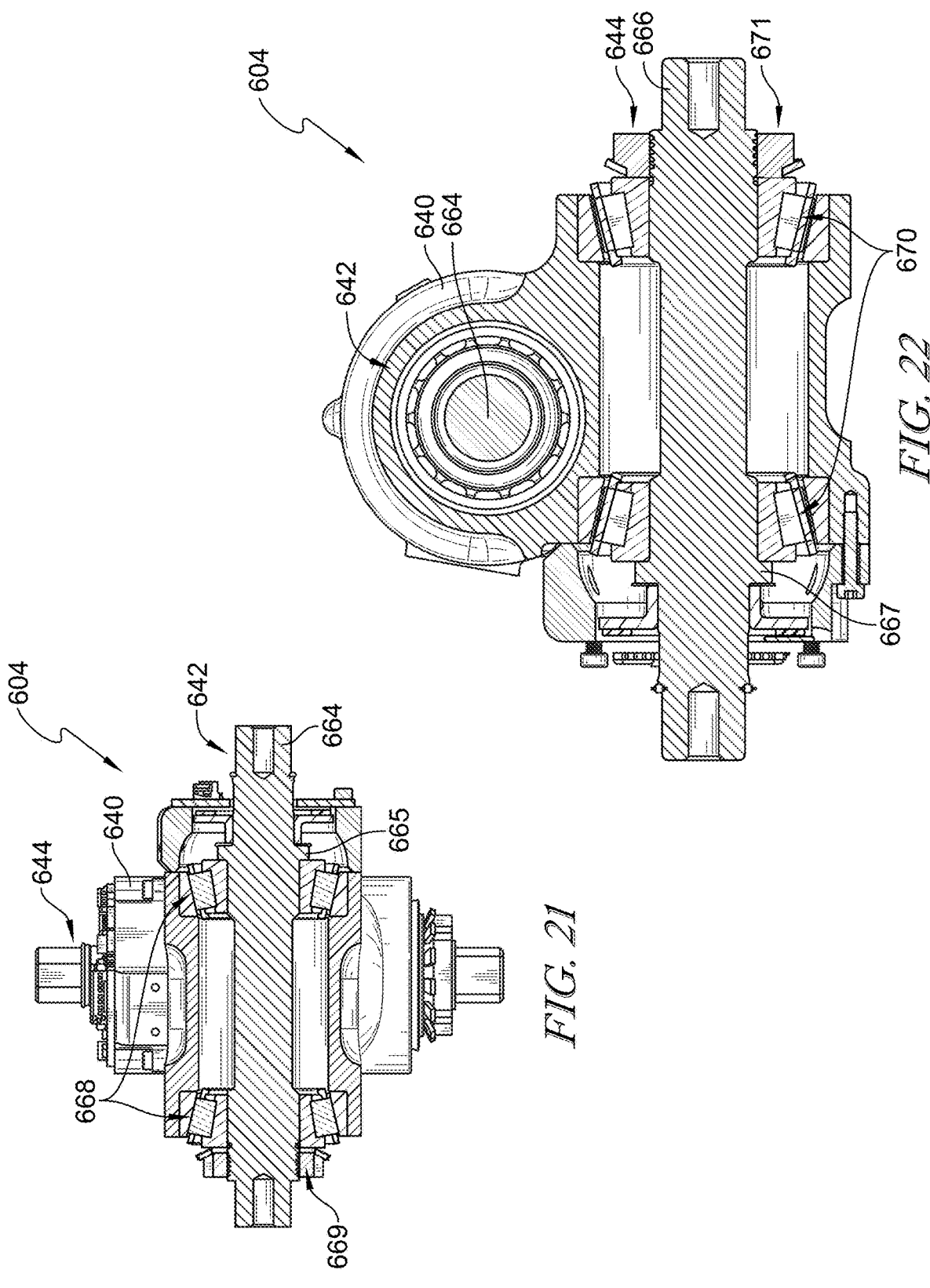
FIG. 21 is a cross section of the articulation member taken along line 21-21 of FIG. 19.
FIG. 22 is a cross section of the articulation member taken along line 22-22 of FIG. 20.

As depicted in the cross-sectional views of FIGS. 7 and 8, the first pivotal (pitch) axis 604*ap*, the third pivotal (yaw) axis 610*p*, and the hip Z actuator axes 603*ap*, 603*bp* are all arranged such that they lie along a common coronal or frontal plane of the robot 100 is in The upright standing position P1. In other words, the axes 603*ap*, 603*bp*, 604*ap*, 610*p* are arranged in a single frontal plane when the robot 100 is in the upright, standing position P1. Furthermore, the first pivotal (pitch) axis 604*ap* extends through the hip Z actuator axes 603*ap*, 603*bp* (intersecting them) when the upper region 200 is in the neutral, forward-facing orientation relative to the lower region 400 as shown in FIGS. 3-15. However, as the upper region 200 pivots or yaws about the third pivotal axis 610*p* (due to actuation provided by the spinal actuator assembly 610), the first pivotal axis 604*ap* will naturally move out of alignment and no longer extend through the (now relatively stationary) hip Z actuator axes 603*ap*, 603*bp*.

The first pivotal (pitch) axis 604*ap* is orthogonal (perpendicular) to the hip Z actuator axes 603*ap*, 603*bp* when the robot 100 is in the upright, standing position P1. However, the first pivotal axis 604*ap* is not orthogonal to the hip Z actuator axes 603*ap*, 603*bp* when the upper region 200 is moved (i.e., rolled) relative to the lower region 400 about the second pivotal (roll) axis 604*bp*, because the axis 604*ap* tilts with the upper region 200. Conversely, the second pivotal (roll) axis 604*bp* is always orthogonal to the hip Z actuator axes 603*ap*, 603*bp* in the third (Z) direction, regardless of the robot's posture, assuming the hip Z axes remain vertical. Similarly, the hip Z actuator axes 603*ap*, 603*bp* are always oriented parallel with the third pivotal (yaw) axis 610*p*, as they are both generally aligned with the vertical Z-direction in this configuration. The hip Z actuator axes 603*ap*, 603*bp* are orthogonal to the upper actuator axes 606*ap*, 606*bp* when the robot 100 is in the upright standing position P1, but are not orthogonal to the upper actuator axes 606*ap*, 606*bp* when the upper region 200 is rolled relative to the lower region 400 about the second pivotal axis 604*bp*.

As seen in side views (e.g., FIG. 6), the second hip actuators 607*a*, 607*b* (hip roll/X) include portions that project rearward beyond the rear support frame member 616. The axes 605*ap*, 605*bp* established by the third hip actuators 605*a*, 605*b* (hip pitch/Y) are positioned forward of the previously mentioned frontal plane (containing 603*ap/bp*, 604*ap*, 610*p*) and thus are located forward of the hip Z axes 603*ap*, 603*bp* when the robot is in the upright standing position P1.

The hip Z actuator axes 603*ap*, 603*bp* are offset horizontally (in the Y-direction) from the central third pivotal (spine yaw) axis 610*p* to locate the third pivotal axis 610*p* laterally between the two hip Z actuator axes 603*ap*, 603*bp*, as clearly shown in the top-down views implied by FIGS. 7 and 8. As previously stated, the hip Z actuator axes 603*ap*, 603*bp* and the third pivotal axis 610*p* are oriented parallel to one another. In the illustrative embodiment shown, the third pivotal axis 610*p* is spaced at equal distances from both of the hip Z actuator axes 603*ap*, 603*bp* in the illustrative embodiment.

Figure 5:
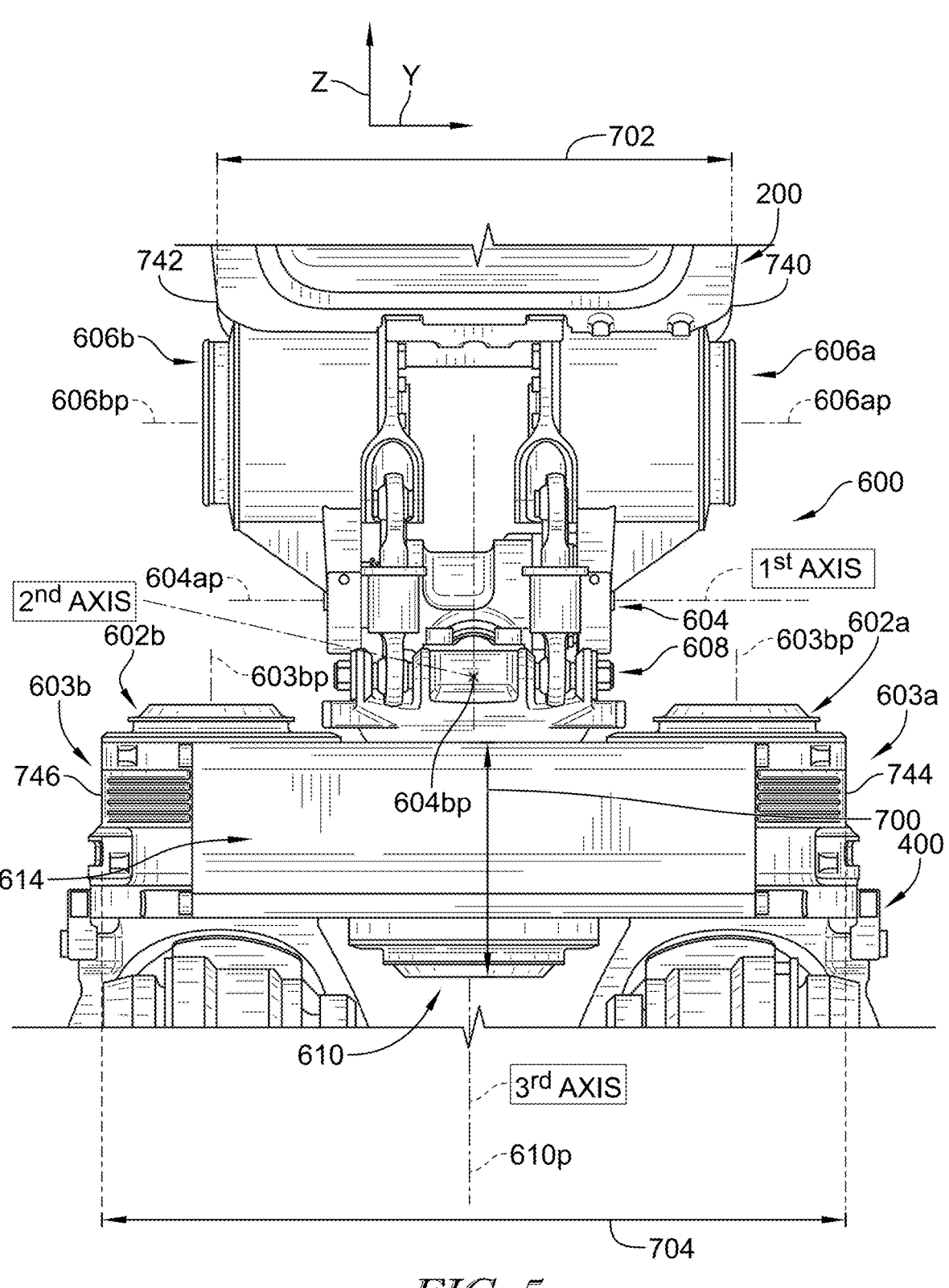
FIG. 5 is a front view of the central region of FIG. 3.

Illustratively, as shown in the cross-section of FIG. 8, the spinal actuator assembly 610 is not only positioned laterally between but is also offset vertically relative to the hip actuators 603*a*, 603*b*. Specifically, a housing 612S of the spinal actuator assembly 610 has an upper housing surface 611 that is offset vertically downward from, or below, an upper peripheral housing surface 613 belonging to the housing 612H of the left and right hip actuator assemblies 603*a*, 603*b*. As such, an outermost edge of the upper housing surface 611 (of the spinal actuator) is offset vertically downward from an innermost edge of the upper peripheral housing surface 613, which is oriented towards or faces the third pivotal axis 610*p*, as shown in FIG. 8. The extent of this vertical downward offset between a representative first point located on the upper housing surface 611 of the spinal actuator assembly 610 and a corresponding second point located on the upper peripheral housing surface 613 of the left and right hip actuator assemblies 602*a*, 602*b* is no more than 20% of a height 700 of the spinal actuator assembly 610 as shown in FIGS. 5 and 8. The foregoing positional relationships of the upper housing surface 611 and the upper peripheral housing surface 613 provides enough space between the torso 204 and the left and right hip actuator assemblies 602*a*, 602*b* to facilitate the torso 204 to pivot or pitch about the first pivotal axis 604*ap* and roll about the second pivotal axis 604*bp* relative to the lower region 400 and the central region 600 without interference. In some embodiments, the vertical spacing or offset between the spinal actuator assembly 610 (specifically surface 611) and the hip actuators 603*a*, 603*b* (specifically surface 613) is controlled to be no more than any value between 10% and 40%, preferably no more than 30%, and more preferably no more than 15% of the overall height 700 of the spinal actuator assembly 610.

In the illustrative embodiment shown in the front view of FIG. 5, a lower end of the torso 204, which is coupled to the upper actuator assemblies 606*a*, 606*b*, has a first width or lower torso width 702 that extends between: (i) a first point 740 located at a first lateral outer extent of the lower end of the torso 204 or within a lower extent of a first side of the torso 204 (and adjacent a first curvilinear side wall 204*a* of the torso 204), and (ii) an opposed second point 742 located at a second lateral outer extent of the lower end of the torso 204 within a lower extent of a second side of the torso 204 (and adjacent a second curvilinear side wall 204*b* of the torso 204). Correspondingly, the left and right hip actuator assemblies 602*a*, 602*b* have a second width or pelvis width 704, that extends between: (i) a first point 744 located at an outer lateral extent of the left hip Z actuator 603*a*, and (ii) an opposed second point 746 located at an outer lateral extent of the right hip Z actuator 603*b*, as shown in FIG. 5. As depicted, the second width or pelvis width 704 is greater than the first width or lower torso width 702. Illustratively, the lower torso width 702 is greater than 67% (or approximately two-thirds) of the pelvis width 704, serving to establish a relatively wide torso region in comparison to the pelvic region width 704. This allows for more internal volume or space for battery storage and computer/circuitry components within the torso region 204 and/or the pelvic region 612. Other robots may feature relatively thinner torso regions compared to their pelvis width, which inherently limits the available space for battery storage or other essential systems housed within the robot's torso. In some embodiments, the first and second widths 702, 704 are within any value between 10% and 50%, preferably within either 15% or 40%, and most preferably within either 20% or 40% of each other.

The hip stators 618 include portions that provide an actuator housing for each first hip actuator 603a, 603b. As shown in the figures, each of the hip actuators 603a, 603b includes a plurality of fins 619 coupled to external surfaces of the actuator housings. The plurality of fins 619 are configured to dissipate heat generated by the hip actuators 603a, 603b during operation to regulate and reduce the operating temperature of the hip actuators 603a, 603b. The actuator housings themselves provide support structure with loading bearing paths through the actuator housings to support the central region 600 and the upper region 200 above the lower region 400. In other words, the depicted robot 100 lacks an exoskeleton configuration that surrounds or substantially surrounds said actuator housings.

The pelvic housing 612 further includes a pair of rotation stops 710, 712 fixed to an exterior surface thereof, the left and right hip actuator assemblies 602a, 602b include a second stop 714 configured to engage one of the rotation stops 710, 712 during rotation of the legs 402a, 402b about each respective hip Z axis 603ap, 603bp to stop rotation of the upper thighs 402a, 402b about each respective hip Z axis 603ap, 603bp at a predefined limit. Similarly, each of the third hip actuators 605a, 605b (hip pitch/Y) may include its own pair of rotation stops 716, 718 coupled to an exterior surface thereof (one for flexion limit, one for extension limit). The relatively moving part of the left and right hip actuator assemblies 602a, 602b include a third stop 720 configured to engage one of the rotation stops 716, 718 during rotation of the upper thighs 402a, 402b about each respective hip pitch axis 605ap, 605bp to stop the pitching rotation of the upper thighs 402a, 402b at predefined limits. Likewise, each of the second hip actuators 607a, 607b (hip roll/X) may include a rotation stop 722 coupled to an exterior surface thereof (providing limits for abduction and adduction). The relatively moving part of the left and right hip actuator assemblies 602a, 602b (associated with the output of actuator 603a/b or a structure connected to it and moving with actuator 607a/b) may include a fourth stop 724 configured to engage the rotation stop 722 during rotation of the upper thighs 402a, 402b about each respective hip roll axis 607ap, 607bp to stop the rolling rotation of the upper thighs 402a, 402b at predefined limits. It should be understood that each of the rotation stop described above (710, 712, 714, 716, 718, 720, 722, 724) can be formed integrally with each respective actuator housing, with other structures of the robot 100 that are external to the housings, and/or integrally formed with a component that is internal to the housings. The stops reduce the likelihood of the robot 100 damaging itself by over-rotating any of its hip joints beyond their safe operational range. Consequently, the hip actuators 603a, 603b, 607a, 607b, 605a, 605b are physically prevented from over-rotating in light of potential errors in control commands that occur, or due to unexpected external forces, or even due to other environmental issues such as mechanical slip occurring between the rotors and stators included within each actuator if the stops engage one another.

b. Spinal Actuator Assembly

The spinal actuator assembly 610 is coupled to the pelvic housing 612 and is located at least partially laterally between the left and right hip actuator assemblies 602a, 602b (specifically, the first hip actuators 603a, 603b) as clearly shown in FIGS. 3-6. The spinal actuator assembly 610 is coupled to the front support frame member 614, the rear support frame member 616 (which form part of the pelvic housing 612), the articulation member 604 (indirectly via the connector assembly 608), and the connector assembly 608 (specifically, the external linkage 630). The spinal actuator assembly 610 includes a stationary part, the spinal stator 622, which is coupled fixedly relative to one of: (i) the pelvic housing 612 and (ii) the articulation member 604 and/or the connector assembly 608. It also includes a rotating part, the spinal rotor 624, which is coupled to the other of: (i) the pelvic housing 612 or (ii) the articulation member 604 and/or the connector assembly 608. It should also be understood that an exterior surface of the spinal actuator assembly 610 housing (612S) may abut directly against an exterior surface of the first hip actuators 603a, 603b housing (612H), or in other embodiments there may be a gap formed between the exterior surface of the spinal actuator assembly 610 and the adjacent exterior surfaces of the first hip actuators 603a, 603b.

The spinal rotor 624 is configured to be moved rotationally by the spinal stator 622, causing pivotal motion about the third pivotal (yaw) axis 610p. Similar to the hip actuators, the spinal stator 622 and the spinal rotor 624 can establish either a brushed or brushless motor configuration. Assuming the stator 622 is fixed to the pelvis 612, the articulation member 604, the connector assembly 608, and therefore the entire upper region 200 are coupled to the spinal rotor 624, allowing for their collective pivotal movement (yaw) about the third pivot axis 610p relative to the pelvic housing 612 and the lower region 400. As shown in the orthogonal views, the third pivotal (yaw) axis 610p extends vertically through and effectively bisects both the first pivotal (pitch) axis 604ap and the second pivotal (roll) axis 604bp when the humanoid robot 100 is in the reference upright, standing position P1.

The spinal actuator assembly 610 (specifically, its rotor 624) is fixedly connected to a lower end of the articulation member 604 (via the external linkage 630), such that the third pivotal (yaw) axis 610p is always arranged orthogonally to the second pivotal (roll) axis 604bp (as both lie in or parallel to the transverse plane). Recalling the structure, the first pivotal (pitch) axis 604ap is arranged to lie physically above the second pivotal (roll) axis 604bp and is configured structurally to pivot about the second pivotal axis 604bp as the upper region 200 rolls from side to side relative to the lower region 400. In this way, the first pivotal axis 604ap always remains orthogonal to the second pivotal axis 604bp, but is only orthogonal to the third pivotal (yaw) axis 610p when the robot 100 is in the specific upright, standing position P1 (i.e., when there is no roll applied).

c. Connector Assembly

The connector assembly 608 interconnects the upper actuator assemblies 606a, 606b (which provide pitch/roll force) and the spinal actuator assembly 610 (which provides yaw rotation and is the base for pitch/roll). This connector assembly 608 includes a pair of connecting rods 626, 628 and an external linkage 630, as shown in the cross-sectional and exploded views of FIGS. 14-18, 25, and 26. The pair of connecting rods 626, 628 extend generally vertically and serve to interconnect the upper actuator assemblies 606a, 606b (specifically, their output levers 656) and the external linkage 630 below. The external linkage 630, in turn, is fixed securely to the spinal rotor 624 for unified movement therewith about the third pivotal (yaw) axis 610*p*. Consequently, rotation of the spinal rotor 624 directly causes identical rotation of the connector assembly 608, the articulation member 604, and the upper region 200 about the third pivotal (yaw) axis 610*p* relative to the stationary lower body.

The connecting rods 626, 628 are coupled at their upper ends to the output of the upper actuator assemblies 606*a*, 606*b* (e.g., at the rotor levers 656) allowing for pivotal movement about respective first rod axes 626*ap*, 628*ap*. They are coupled at their lower ends to the external linkage 630, allowing for pivotal movement about respective second rod axes 626*bp*, 628*bp*. The connecting rods 626, 628 are therefore configured to pivot about each of these axes (626*ap*, 628*ap*, 626*bp*, 628*bp*) in response to the push/pull or rotational movement generated by one or both of the upper actuator assemblies 606*a*, 606*b*. As the upper actuator assemblies 606*a*, 606*b* move the connecting rods 626, 628 vertically or cause them to pivot about their end axes 626*ap*, 628*ap*, 626*bp*, 628*bp*, this motion is transferred through the articulation member 604, causing the upper region 200 to pitch forward/backward about the first pivotal axis 604*ap* and/or roll side-to-side about the second pivotal axis 604*bp*, relative to the lower region 400. In the illustrative embodiment shown, each end of the connecting rods 626, 628 includes a ball joint to allow movement of the connecting rods 626, 628 relative to one another, relative to the upper region 200 (via the upper actuators), and relative to the external linkage 630, accommodating the complex geometry changes during combined pitch, roll, and yaw motions.

The connecting rods 626, 628 are positioned such that they are offset from both the first pivotal (pitch) axis 604*ap* and the third pivotal (yaw) axis 610*p*, primarily along the direction of the second pivotal (roll) axis 604*bp* (i.e., they are offset front/back). In the specific illustrative embodiment, the connecting rods 626, 628 are shown offset from the first and third pivotal axes 604*ap*, 610*p* in a forward direction along the second pivotal (roll) axis 604*bp*, so as to be located in front of the third pivotal (yaw) axis 610*p* when the humanoid robot 100 is in its neutral, forward-facing orientation. As such, the first and second connecting rods 626, 628 are positioned forward of the articulation member 604 along the second pivotal axis 604*bp*. When viewed in the upright, standing position P1 (e.g., FIG. 6), the connecting rods 626, 628 are oriented generally parallel with the third pivotal (yaw) axis 610*p* (i.e., vertically). The connecting rods 626, 628 are also offset laterally (in the Y-direction) along the second pivotal (roll) axis 604*bp* from the central third pivotal (yaw) axis 610*p* when the humanoid robot 100 is in the upright standing position P1 and in the forward-facing orientation. As depicted, the connecting rods 626, 628 appear to be spaced at equal lateral distances from the third pivotal axis 610*p* and also at equal distances from the second pivotal axis 604*bp* (when viewed from the front) when the humanoid robot 100 is in the upright standing position P1 and in the forward-facing orientation.

The external linkage 630 itself comprises a linkage base 632 and a pair of rod supports 634, 636 coupled to the linkage base 632. The linkage base 632 is the part that is directly coupled to the spinal actuator assembly 610 (specifically, the rotor 624) to mount the external linkage 630 securely to the spinal actuator assembly 610. The rod supports 634, 636 are coupled to a front end (as depicted) of the linkage base 632 and provide the attachment points for a respective connecting rod 626, 628, thereby mounting the lower ends of the connecting rods 626, 628 to the external linkage 630. As mentioned, each of the connecting rods 626,

628 is coupled to its respective rod support 634, 636, by a ball joint, to allow the necessary relative movement between the external linkage 630 and the connecting rods 626, 628 during operation.

d. Articulation Member

The articulation member 604 is arranged vertically between the upper actuator assemblies 606*a*, 606*b* and the spinal actuator assembly 610 and includes an articulation housing 640, a first articulation bearing 642, and a second articulation bearing 644 as shown in FIGS. 3-6 and 18-22. In the depicted design, the articulation housing 640 is a unitary structure housing both of the articulation bearings 642, 644 within orthogonally oriented sections. The articulation housing 640 remains in a stationary angular position relative to the external linkage 630 (and thus the spinal rotor 624) at all times; it rotates with the spinal yaw motion but does not itself pitch or roll relative to the linkage 630.

The first articulation bearing 642 is coupled to the upper actuator assemblies 606*a*, 606*b* (via the torso structure 204 to which they and the bearing shaft 664 are attached) and is the component that physically establishes the first pivotal (pitch) axis 604*ap*. The second articulation bearing 644 is coupled to at least one of the external linkage 630 and/or directly to the spinal actuator assembly 610 rotor 624 (via its shaft 666 being fixed to the linkage 630) and is the component that physically establishes the second pivotal (roll) axis 604*bp*.

As detailed in FIGS. 18-22, the articulation housing 640 includes a first cylindrical housing member 660 and a second cylindrical housing member 662. The first cylindrical housing member 660 houses the first articulation bearing 642 (for pitch) and is coupled to an upper end of the second cylindrical housing member 662. The second cylindrical housing member 662 houses the second articulation bearing 644 (for roll) and is coupled to a lower end of the first cylindrical housing member 660. As depicted, the housing members 660, 662 may have the same or similar lengths and widths/diameters, but they are oriented orthogonally (at 90 degrees) to one another to establish the orthogonal first (pitch) pivotal axis 604*ap* and second (roll) pivotal axis 604*bp*.

Each of the articulation bearings 642, 644 has the same or a similar structure and dimensions to each other and includes a pivot shaft 664, 666 located at least partially internally to each respective housing member 660, 662, and a set of internal rolling elements, such as rollers 668, 670, located radially between the pivot shaft 664, 666 and the inner surface of each respective housing member 660, 662, which allow low-friction rotation between the shaft 664, 666 and the housing 660, 662. The pivot shaft 664 of the first bearing 642 (pitch axis) projects outward from each side of the housing member 660 and mounts securely to the torso 204 structure (or a frame connected to it and the upper actuators 606*a/b*). The pivot shaft 666 of the second bearing 644 (roll axis) projects outward from each side of the housing member 662 and mounts securely to the external linkage 630 (which connects to the spinal rotor 624). In this configuration, the first pivot shaft 664 effectively acts as a rotor to move with the torso 204 about the first pivot (pitch) axis 604*ap* when the upper actuator assemblies 606*a*, 606*b* are actuated. Conversely, the second pivot shaft 666 acts as a stator to allow rotation of the rest of the articulation member 604 (housing 640 and first shaft 664) along with the upper region 200 and about the second pivotal (roll) axis 604*bp*. The rollers 668, 670 are tapered roller bearings in the illustrative embodiment to allow rotational movement between the housing 640 and the shafts 664, 666 while simultaneously blocking relative axial translation of the shafts 664, 666 along their respective axes 604*ap*, 604*bp* due to the angled nature of the rollers.

To further manage axial loading and assembly, each of the shafts 664, 666 includes a shoulder 665, 667 configured to engage an interior structure of the housing 640. An outer diameter of the shoulder 665, 667 is sized to allow the shaft to be inserted in one direction through each respective housing member 660, 662. A retainer 669, 671 then engages an end of the shafts 664, 666 opposite from the shoulder 665, 667 to block axial translation of the shafts 664, 666 along their respective axes 604*ap*, 604*bp* in either direction once assembled. When fully assembled, the housing members 660, 662 and the shafts 664, 666 bisect one another geometrically, such that a center point of each axis 604*ap*, 604*bp* is aligned vertically with one another, and both are aligned with the third pivotal (yaw) axis 610*p* when the robot 100 is in the neutral upright, standing position P1.

It is noteworthy that the articulation member 604 lacks any actuators or hydraulics and is used to establish the first (pitch) and second (roll) pivotal axes 604*ap*, 604*bp* in an orthogonal configuration. The articulation member 604 is positioned vertically between the spinal actuator assembly 610 (below) and the upper actuator assemblies 606*a*, 606*b* (above) in order to provide these first and second pivotal axes 604*ap*, 604*bp* at a location vertically between the spinal actuator assembly 610 and the upper actuator assemblies 606*a*, 606*b*. This position allows the upper region 200 to independently pitch about the first pivotal axis 604*ap* and roll about the second pivotal axis 604*bp* relative to the lower region 400 (driven by actuators 606*a/b*), while simultaneously allowing the spinal actuator assembly 610 to independently twist or yaw the entire upper region 200 and the articulation member 604 together about the third pivotal axis 610*p* relative to the lower region 400.

In the illustrative embodiment, as seen in FIG. 5, the articulation member 604 has a characteristic width 730 (along the Y-axis) that is within about 5% to about 15% of a corresponding width 732 of the spinal actuator assembly 610 below it, wherein said articulation member width 730 is slightly greater than the spinal actuator assembly width 732. Both the width 730 of the articulation member 604 and the width 732 of the spinal actuator assembly 610 are smaller than the pelvis width 704 (defined by the left and right hip actuator assemblies 602*a*, 602*b*) and also smaller than the width defined by the upper actuator assemblies 606*a*, 606*b* above. These relative dimensions establish lateral spaces 734, 736 on each side of the relatively narrow articulation member 604, specifically located vertically above the wider left and right hip actuator assemblies 602*a*, 602*b* and below the wider upper actuator assemblies 606*a*, 606*b*. This configuration intentionally provides the necessary physical spacing or clearance for the upper region 200 (and upper actuators 606*a/b*) to tilt or roll significantly relative to the lower region 400 (and hip actuators 602*a/b*) without mechanical interference.

e. Upper Actuator Assemblies

The first upper actuator assembly 606*a* and the second upper actuator assembly 606*b* are operably coupled to the torso 204 and configured to pivot the upper region 200 relative to the lower region 400 about the first (pitch) pivotal axis 604*ap* and the second (roll) pivotal axis 604*bp*, either individually or simultaneously. They achieve this by applying forces, effectively pushing on and/or pulling the lower ends of the connecting rods 626, 628, as shown in FIGS. 3-12. In the illustrative embodiment, the upper actuator assemblies 606*a*, 606*b* include rotation actuators each having an upper actuator stator 650 coupled between the upper region 200 (torso base) and the first articulation bearing 642 (specifically, its shaft 664), and an upper-actuator rotor 652 coupled between the upper actuator stator 650 and a respective connecting rod 626, 628 below it.

The upper actuator rotors 652 are configured to rotate about their respective rotor axes 652*a*, 652*b* relative to the stators 650, thereby causing controlled movement of the upper region 200 relative to the lower region 400 and the central region 600 via the connecting rods and articulation member. Specifically, rotation of both rotors 652 in a coordinated first direction (e.g., both rotating forward) about their respective rotor axes 652*a*, 652*b* would cause the connecting rods 626, 628 to move in a way that results in the upper region 200 pitching forward about the first pivotal axis 604*ap*. Conversely, rotation of both rotors 652 in a coordinated second direction (e.g., both rotating backward) about their respective rotor axes 652*a*, 652*b*, opposite the first direction, would cause the upper region 200 to pitch rearward about the first pivotal axis 604*ap*. Furthermore, differential rotation of each rotor 652 in opposite directions from one another (e.g., left rotor forward, right rotor backward, or vice-versa) would cause the upper region 200 to tilt left or right (roll) about the second pivotal axis 604*bp* relative to the lower region 400. The rotors 652 can be moved in precisely controlled combinations of these motions simultaneously, thereby causing complex pivotal movement of the upper region 200 relative to the lower region 400 about both the first pivotal (pitch) axis 604*ap* and the second pivotal (roll) axis 604*bp* at the same time.

Figure 24:
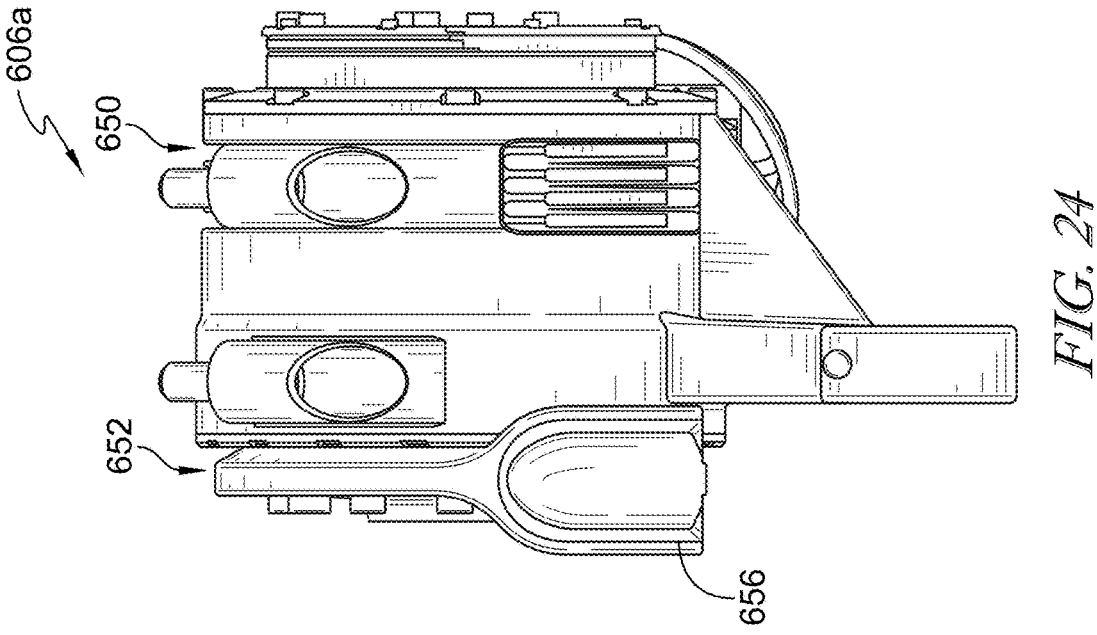
FIG. 24 is a front view of one of the upper actuator assemblies of the central region of FIG. 3.
Figure 23:
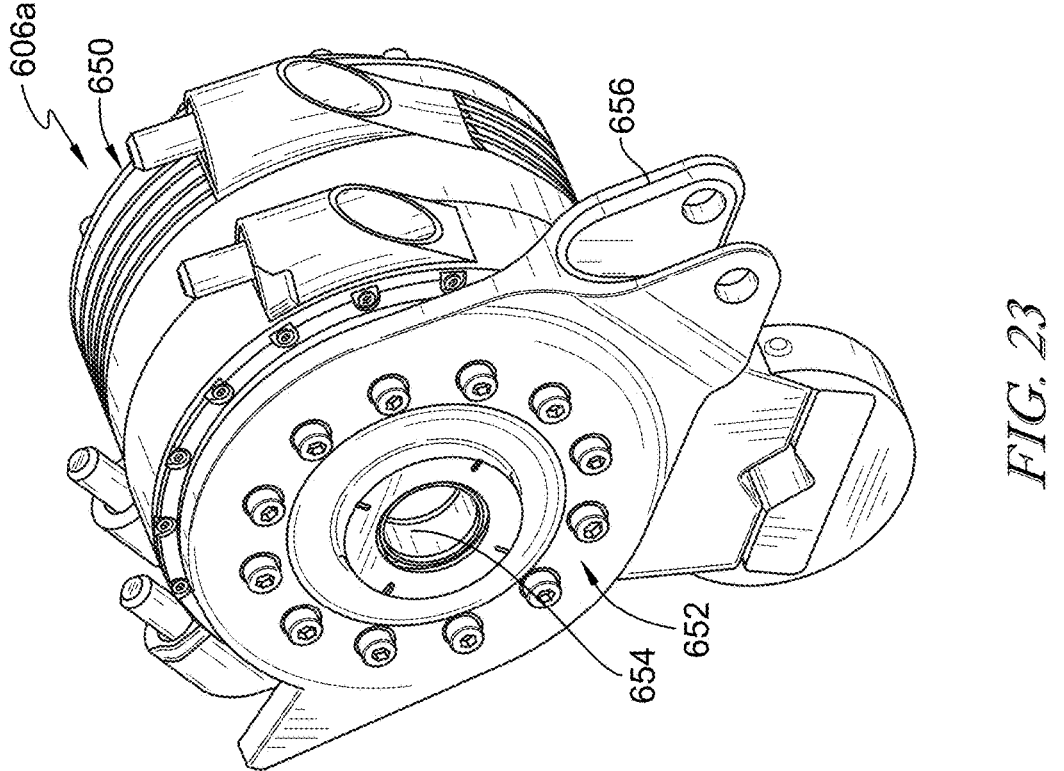
FIG. 23 is a perspective view of one of the upper actuator assemblies of the central region of FIG. 3.
Figure 26:
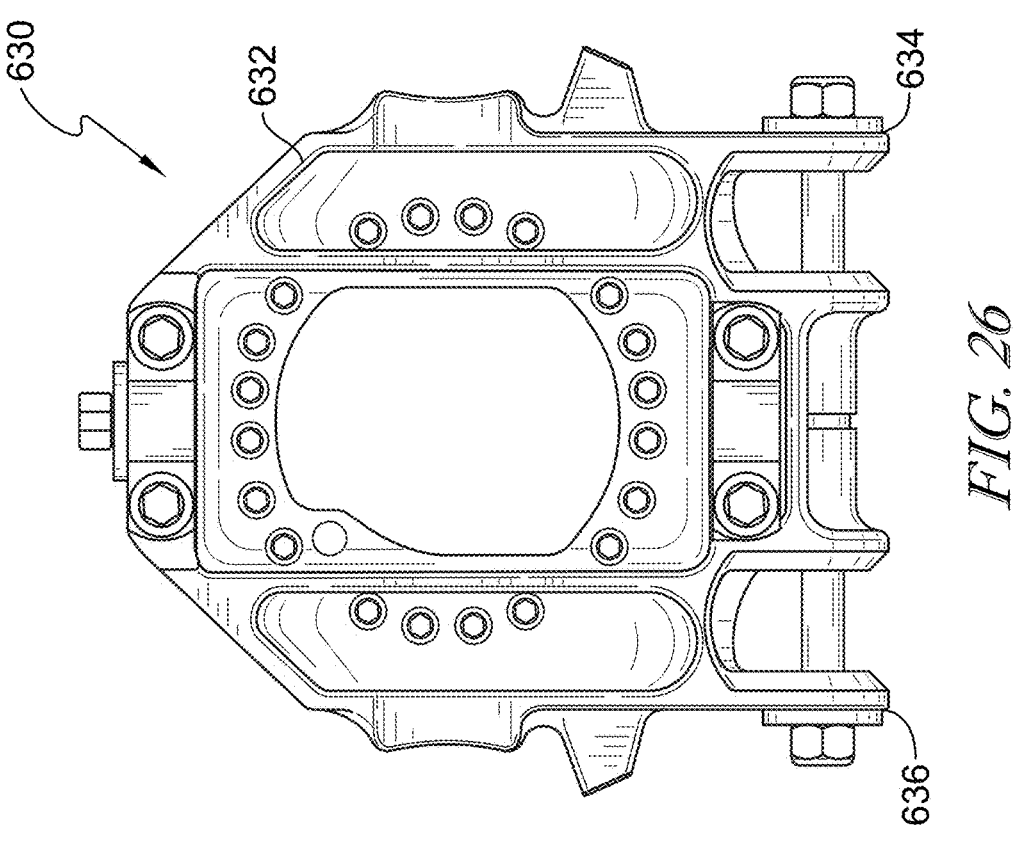
FIG. 26 is a top view of the external linkage of the connector assembly of the central region of FIG. 3.
Figure 25:
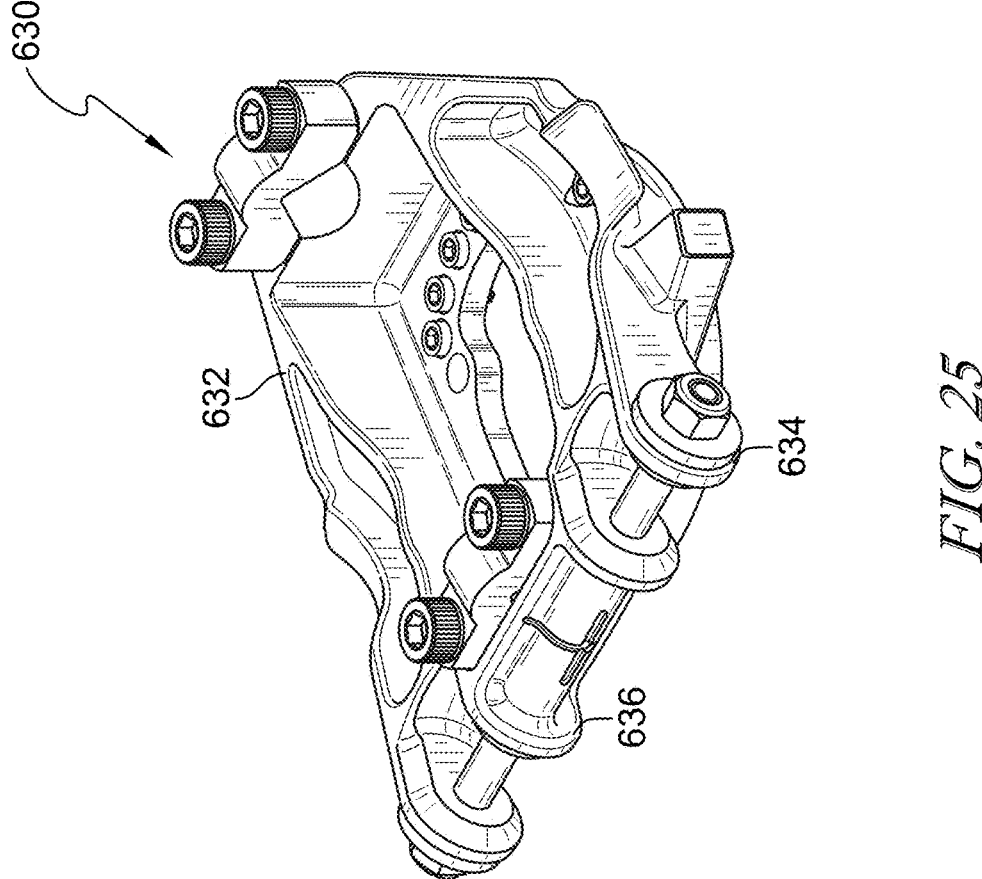
FIG. 25 is a perspective view of the external linkage of the connector assembly of the central region of FIG. 3.
Figure 27:
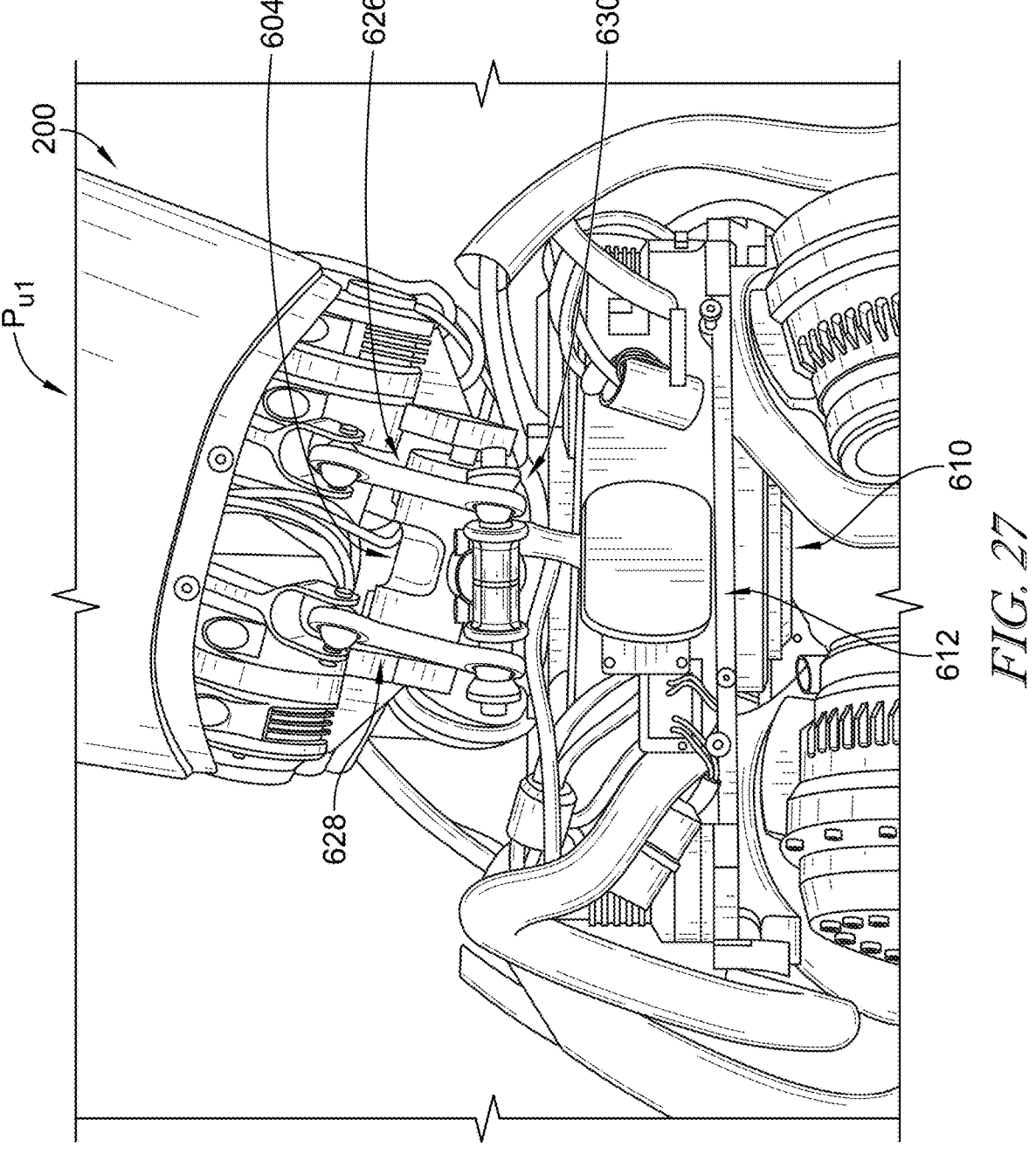
FIG. 27 is a front view of a portion of the humanoid robot of FIG. 1, showing the upper region in a first use position PU1 relative to the robot's left side and displaced about the first, second and third axes.
Figure 28:
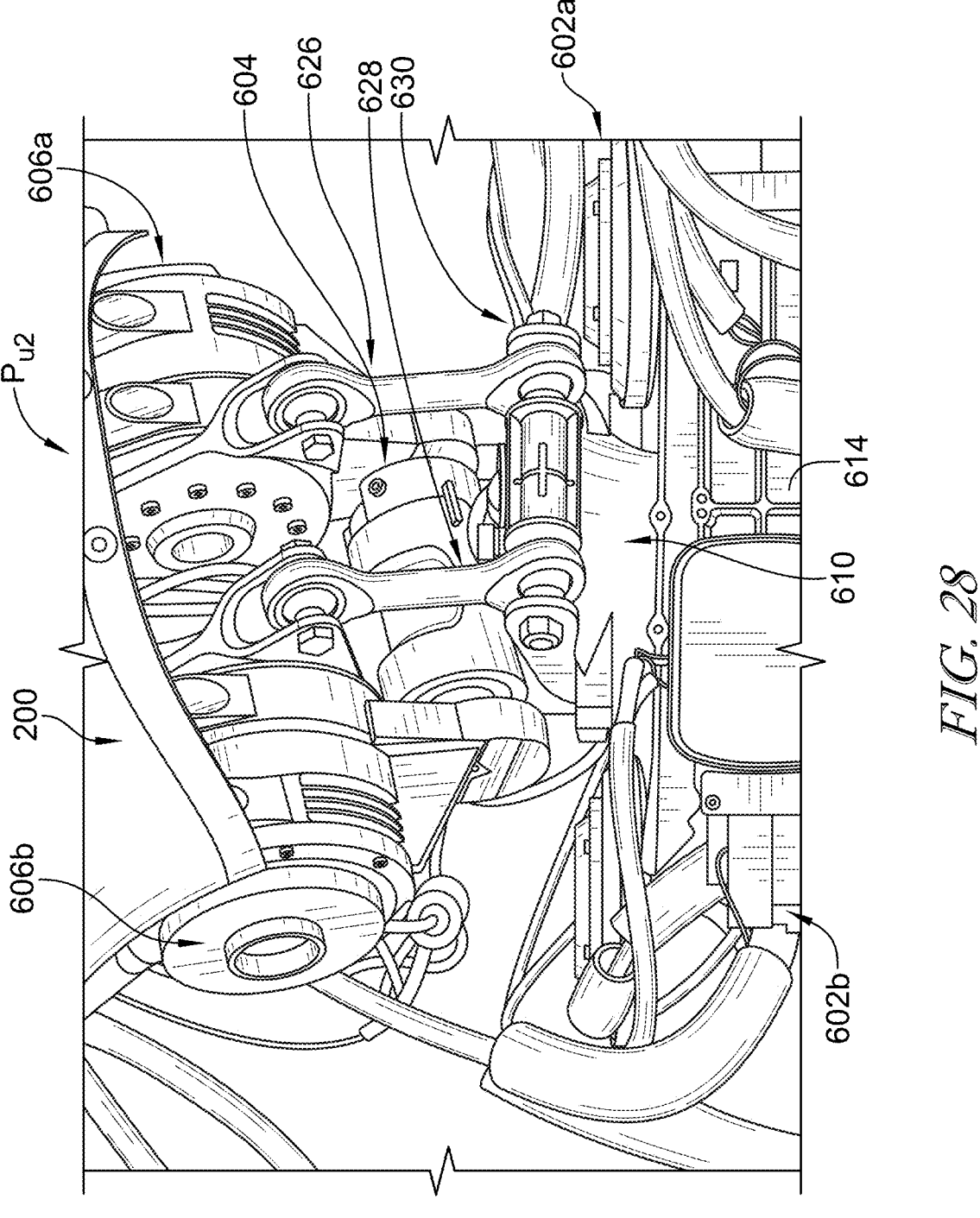
FIG. 28 is a front view of a portion of the humanoid robot of FIG. 1, showing the upper region in a second use position PU2 relative to the robot's right side and displaced about the second axis and the third axis, wherein the second use position is different than the first use position of FIG. 27.
Figures 29, 30:
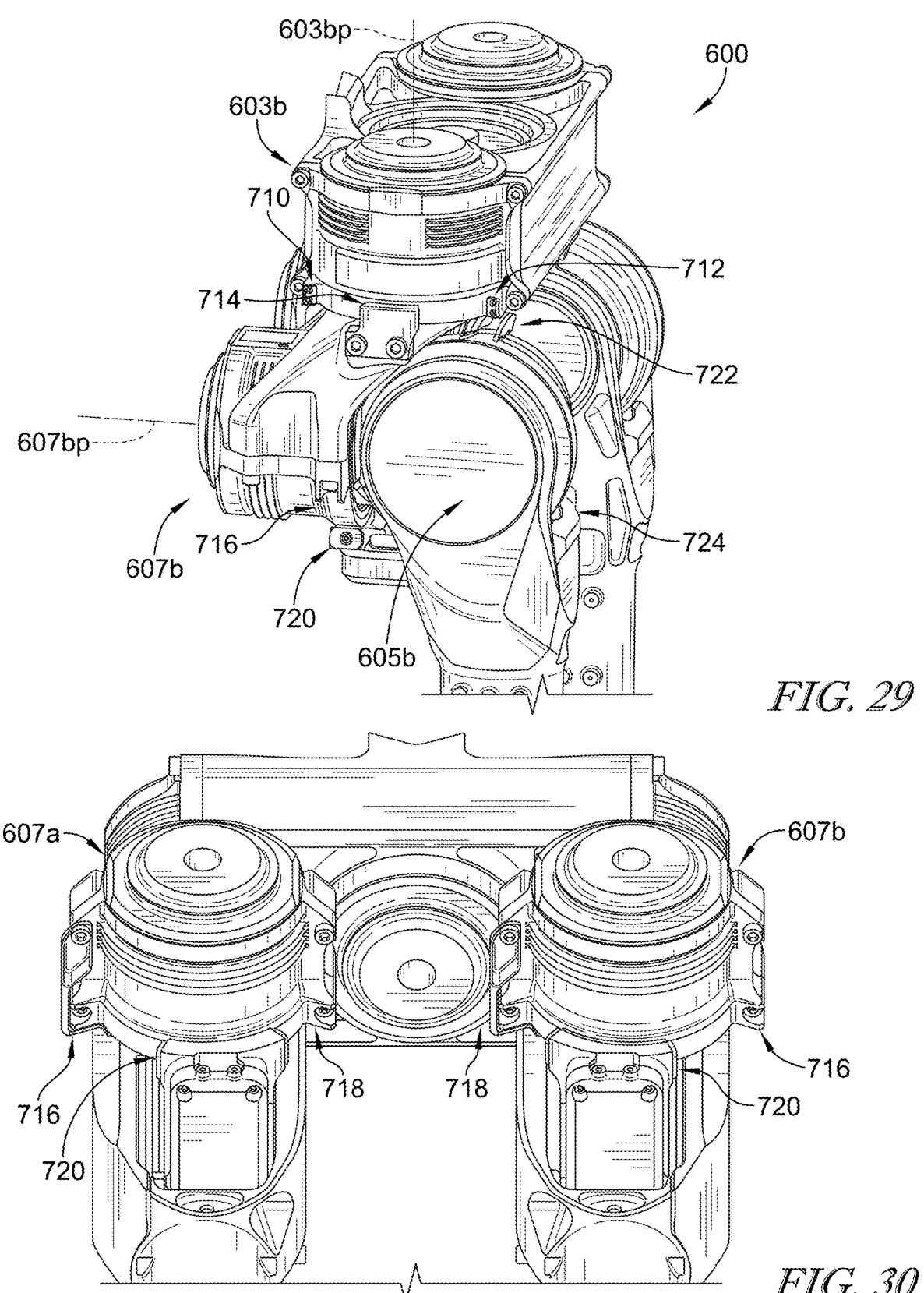
FIG. 29 is a perspective side view of a portion of the humanoid robot of FIG. 1 in the upright, standing position P1, showing an extent of the central region and an extent of the lower region, wherein the articulation member and the connector assembly have been omitted; and, FIG. 30 is a perspective rear view of a portion of the humanoid robot of FIG. 1 in the upright, standing position P1, showing an extent of the central region and an extent of the lower region, wherein the articulation member and the connector assembly have been omitted.

As detailed in the figures (e.g., FIGS. 23, 24 and implied in FIGS. 6 and 7), each of the upper-actuator rotors 652 includes a rotor shaft 654 coupled to each respective the upper-actuator stator 650 and a rotor lever 656 coupled to each respective rotor shaft 654 and extending outwards to connect to each respective connecting rod 626, 628 below. The rotor shafts 654 establish the rotor axes 652*a*, 652*b* of each upper-actuator rotor 652. The rotor levers 656 project radially or tangentially away from the rotor shafts 654, effectively offsetting the connection point for the connecting rods 626, 628 from the rotor shafts 654. The rotor axes 652*a*, 652*b* of the upper actuator assemblies 606*a*, 606*b* extend parallel to the first pivotal (pitch) axis 604*ap* and perpendicular to the second pivotal (roll) axis 604*bp* when the humanoid robot 100 is in the reference upright, standing position P1. As mentioned earlier, each rotor lever 656 is coupled to its corresponding connecting rod 626, 628 by a ball joint to allow the necessary multi-axis relative movement between the upper region 200 (carrying the actuators) and the connecting rods 626, 628 (which translate forces to the articulation member) during combined motions.

In some embodiments, the upper actuator assemblies 606*a*, 606*b* can include a different type of actuator, such as linear actuators (e.g., electric cylinders or ballscrew actuators), instead of the rotational actuators shown. In such a configuration, the linear actuators could directly interconnect the upper region 200 (torso base) and each of the connecting rods 626, 628, respectively. In this linear actuator scenario, simultaneous retraction of both linear actuators would cause the upper region 200 to pitch forward about the first pivotal axis 604*ap*. Simultaneous extension of both linear actuators would cause the upper region 200 to pitch rearward about the first pivotal axis 604*ap*. Extension of one linear actuator combined with retraction of the other linear actuator would cause the upper region 200 to roll left or right about the second pivotal axis 604*bp* relative to the lower region 400. Similar to the rotational case, the linear actuators could be moved in controlled combinations to cause pivotal movement of the upper region 200 relative to the lower region 400 about both the first pivotal axis 604*ap* and the second pivotal axis 604*bp* at the same time.

D. Shoulder Actuator Assemblies

Moving to the upper region 200, the left and right shoulders 206*a*, 206*b* each include a corresponding shoulder actuator assembly 207*a*, 207*b* configured to move the left and right arm assembly (208*a*, 208*b*) relative to the torso 204 about respective shoulder axes 207*ap*, 207*bp* as shown in the cross-sectional views of FIGS. 7 and 8. The shoulder axes 207*ap*, 207*bp* are arranged geometrically to lie at an angle with respect to one another and also with respect to each of the principal axes (604*ap*, 604*bp*, 610*p*) previously defined for the central region 600. As a specific example, each of the shoulder axes 207*ap*, 207*bp* are arranged at an angle 209, 211 relative to the vertical third pivotal (spine yaw) axis 610*p*, with this angle falling within a range of about 25 degrees to about 50 degrees. In some embodiments the angles 209, 211 may be within a narrower range of about 30 degrees to about 45 degrees. In some embodiments the angles 209, 211 may be within a range of about 35 degrees to about 40 degrees. Such a relationship may allow for a greater range of motion of the arms relative to the torso 204 compared to simpler vertical or horizontal alignments. The shoulder axes 207*ap*, 207*bp* are not aligned within the same coronal plane that contains the central region axes 603*ap*, 603*bp*, 604*ap*, 610*p* when the robot 100 is in the upright, standing position P1. In other words, the shoulder axes 207*ap* and 207*bp* are positioned geometrically in a plane that is somewhat rearward of the single frontal plane identified earlier as containing the central region axes 603*ap*, 603*bp*, 604*ap*, and 610*p*.

It is to be understood that the disclosure is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the disclosure, and the scope of protection is only limited by the scope of the accompanying Claims.

It should also be understood that substantially utilized herein means a deviation that is less than 15% and preferably less than 5%. It should also be understood that other configuration or arrangements of the above described components is contemplated by this Application. while the central region 600 is described above in connection with a humanoid robot 100, it should be understood that said central region 600 may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an hand attached to an arm, etc.), delta robots (e.g., parallel link robots with parallel joint linkages connected with a common base, having direct control of each joint over the hand, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems.

the humanoid robot 100 may include one or more sensor assemblies (e.g., cameras, temperature, pressure, force, inductive or capacitive touch), motors (e.g., servomotors and stepper motors), actuators, biasing members, encoders, housing, or any other component known in the art that is used in connection with robot systems. In addition, the humanoid robot 100 may omit other components that may be used in robot systems like tactile sensor assemblies, pulleys, pneumatic mechanisms, or hydraulic mechanisms, and/or synthetic tendons.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

it is to be understood that the disclosure is not limited to the exact details of construction, operation, exact materials, or embodiments shown and described, as obvious modifications and equivalents will be apparent to one skilled in the art; for example, the photographs may be digital photographs or paper based photographs that may then be scanned into digital form. While the specific embodiments have been illustrated and described, numerous modifications come to mind without significantly departing from the spirit of the disclosure.

As used herein, the terms "component," "system" and the like in relation to discussions about computer-related processes and systems are intended to refer to a computer-related entity, either hardware, a combination of hardware and software, software, or software in execution. For example, a component may be, but is not limited to being, a process running on a processor, a processor, an object, an instance, an executable, a thread of execution, a program, a computer, or both. By way of illustration, both an application running on a computer and the computer can be a component. One or more components may reside within a process, a thread of execution, or both, and a component may be localized on one computer and/or distributed between two or more computers.

Furthermore, all or portions of the computer-related processes and systems can be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Where the above examples, embodiments and implementations reference examples, it should be understood by those of ordinary skill in the art that other helmet and manufacturing devices and examples could be intermixed or substituted with those provided. In places where the description above refers to particular embodiments of helmets and customization methods, it should be readily apparent that a number of modifications may be made without departing from the spirit thereof and that these embodiments and implementations may be applied to other to helmet customization technologies as well. Accordingly, the disclosed subject matter is intended to embrace all such alterations, modifications and variations that fall within the spirit and scope of the disclosure and the knowledge of one of ordinary skill in the art.

The invention claimed is:

1. A humanoid robot comprising:
an upper region including a head, a torso, and a pair of arms coupled to the torso;
a lower region spaced apart from the upper region and including a pair of legs; and,
a central region interconnecting the upper region and the lower region, the central region configured to allow movement of the upper region and the lower region relative to one another, the central region including:
(i) an articulation member having a pitch pivotal axis and a roll pivotal axis that is oriented orthogonal to the pitch pivotal axis;
(ii) a spinal actuator assembly coupled to the articulation member and having a yaw pivotal axis that is oriented orthogonal to both the pitch pivotal axis and the roll pivotal axis when the humanoid robot is in an upright, standing position, and wherein the spinal actuator assembly is configured to pivot the articulation member and the upper region about the yaw pivotal axis; and,
(iii) a first upper actuator assembly and a second upper actuator assembly, wherein both the first and second upper actuator assemblies are operably coupled to the torso and configured to move the upper region relative to the lower region about both the pitch pivotal axis and the roll pivotal axis.

2. The humanoid robot of claim 1, wherein the articulation member is positioned between the first and second upper actuator assemblies and the spinal actuator assembly.

3. The humanoid robot of claim 2, wherein the articulation member includes a first articulation bearing and a second articulation bearing,
the first articulation bearing defining the pitch pivotal axis and having a first end coupled to the first upper actuator assembly and a second end coupled to the second upper actuator assembly, and
the second articulation bearing defining the roll pivotal axis and located vertically below the first articulation bearing.

4. The humanoid robot of claim 3, wherein the first articulation bearing is at least partially received in a first generally cylindrical housing of the articulation member and the second articulation bearing is at least partially received in a second generally cylindrical housing of the articulation member.

5. The humanoid robot of claim 3, wherein the yaw pivotal axis bisects the first and roll pivotal axes when the robot is in the upright standing position.

6. The humanoid robot of claim 1, further comprising a connector assembly coupled between the first and second upper actuator assemblies and the spinal actuator assembly for movement about the yaw pivotal axis by the spinal actuator assembly, and wherein the connector assembly is further coupled between the articulation member and the spinal actuator assembly.

7. The humanoid robot of claim 6, wherein the connector assembly includes a first connecting rod, a second connecting rod, and an external linkage,
wherein the first connecting rod has a first end coupled to the first upper actuator assembly and a second end coupled to the external linkage,
wherein the second connecting rod has a first end coupled to the second upper actuator assembly and a second end coupled to the external linkage, and
wherein the external linkage has an upper end coupled to the articulation member and a lower end coupled to the spinal actuator assembly.

8. The humanoid robot of claim 7, wherein the first and second connecting rods are positioned forward of the articulation member along the roll pivotal axis when the humanoid robot is in the upright, standing position.

9. The humanoid robot of claim 7, wherein the external linkage includes a linkage base coupled to the articulation member, a first rod support coupled to a front end of the linkage base and to the first connecting rod, and a second rod support coupled to the front end of the linkage base and to the second connecting rod.

10. The humanoid robot of claim 1, wherein the upper region is configured to pivot about the roll pivotal axis in response to coordinated movement of both (i) a portion of the first upper actuator assembly in a first direction, and (ii) a portion of the second upper actuator assembly in a second direction that is opposite the first direction.

11. The humanoid robot of claim 1, wherein the upper region is configured to pivot about the pitch pivotal axis in response to coordinated movement in a first direction of both (i) a portion of the first upper actuator assembly, and (ii) a portion of the second upper actuator assembly.

12. The humanoid robot of claim 10, wherein the first upper actuator assembly and the second upper actuator assembly are rotational actuators.

13. The humanoid robot of claim 1, wherein the central region further includes: (i) a first hip actuator, (ii) a second hip actuator, and (iii) a rear support frame member coupled to the first hip actuator, the second hip actuator, and the spinal actuator assembly.

14. The humanoid robot of claim 13, wherein the yaw pivotal axis is oriented vertically, when the humanoid robot is in an upright, standing position, between the first hip actuator and the second hip actuator.

15. The humanoid robot of claim 13, wherein the first hip actuator has an uppermost surface offset vertically upward from an uppermost surface of the spinal actuator assembly.

16. The humanoid robot of claim 15, wherein the uppermost surface of the first hip actuator is offset vertically upward from the uppermost surface of the spinal actuator assembly by a distance that is no more than 20% of a height of the spinal actuator assembly.

17. The humanoid robot of claim 13, wherein the robot has a pelvis width defined between a first point at a first lateral outer extent of the first hip actuator and a second point located at a second lateral outer extent of the second hip actuator, and wherein a lower end of the torso has a lower torso width between a first point at a first lateral outer extent of the lower end of the torso and a second point located at a second lateral outer extent of the lower end of the torso, and wherein the lower torso width is at least 67% of the pelvis width.

18. A humanoid robot comprising:

an upper region including a head, a torso, and a pair of arms coupled to the torso, and wherein the torso includes a lower torso width that extends between a first lower point located within a lower extent of a first side of the torso and a second lower point located within a lower extent of a second side of the torso;

a lower region spaced apart from the upper region and including a pair of legs; and, a central region interconnecting the upper region and the lower region, the central region configured to allow movement of the upper region and the lower region relative to one another, the central region including:

(i) a spinal actuator assembly having a spinal pivotal axis that is oriented orthogonal to an upper housing surface of the spinal actuator assembly when the humanoid robot is in an upright, standing position;

(ii) a rear support frame member coupled to a left hip yaw actuator, a right hip yaw actuator, and the spinal actuator assembly;

(iii) a pelvis width that extends between a first point located on a lateral outermost extent of the left hip yaw actuator and a second point located on a lateral outermost extent of the right hip yaw actuator, and wherein the lower torso width is greater than 67% of the pelvis width.

19. The humanoid robot of claim 18, wherein the central region further includes:

(i) an articulation member having a pitch pivotal axis and a roll pivotal axis that is oriented orthogonal to the pitch pivotal axis; and (ii) wherein the spinal pivotal axis is oriented orthogonal to both the pitch pivotal axis and the roll pivotal axis when the humanoid robot is in an upright, standing position.

20. The humanoid robot of claim 19, wherein the central region further includes a first upper actuator assembly and a second upper actuator assembly, wherein both the first and second upper actuator assemblies are operably coupled to the torso and configured to move the upper region relative to the lower region about the pitch pivotal axis and the roll pivotal axis.

21. The humanoid robot of claim 18, wherein an uppermost surface of the left hip YAW actuator is offset vertically from an uppermost surface of the spinal actuator assembly by a distance that is no more than 20% of a height of the spinal actuator assembly.

22. The humanoid robot of claim 18, wherein the central region further includes a left hip X actuator that is coupled to the left hip yaw actuator, and a right hip X actuator that is coupled to the right hip yaw actuator, and wherein a substantial extent of said left and right hip X actuators are positioned rearward of the rear support frame member.

23. The humanoid robot of claim 22, wherein the humanoid robot further comprises a left hip Y actuator that is vertically positioned between the left hip X actuator and a left foot, and a right hip Y actuator that is positioned between the right hip X actuator and a right foot.

24. The humanoid robot of claim 18, wherein the central region does not include a front support frame coupled to the left hip yaw actuator and the right hip yaw actuator.

25. The humanoid robot of claim 18, wherein electrical wires are routed through tubes formed in the center of the left hip yaw actuator in order to electrically couple a lower actuator with a battery pack.

26. The humanoid robot of claim 18, wherein the torso lacks a V-shaped configuration.

27. The humanoid robot of claim 18, wherein the torso includes a substantially rectangular lower base/bottom surface.

28. The humanoid robot of claim 18, further comprising an end effector coupled to one arm of the pair of arms, and wherein the end effector includes more than 20 degrees of freedom.

29. The humanoid robot of claim 18, wherein the head is configured to convey its current operating state to nearby humans without using human-like features.

* * * * *